(12) United States Patent
Hase et al.

(10) Patent No.: US 11,325,480 B2
(45) Date of Patent: May 10, 2022

(54) TRAVEL CONTROL APPARATUS

(71) Applicant: DENSO CORPORATION, Kariya (JP)

(72) Inventors: Tomomi Hase, Kariya (JP); Mitsuharu Higashitani, Kariya (JP); Noriaki Ikemoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 136 days.

(21) Appl. No.: 16/653,461

(22) Filed: Oct. 15, 2019

(65) Prior Publication Data

US 2020/0039527 A1    Feb. 6, 2020

Related U.S. Application Data

(63) Continuation of application No. PCT/JP2018/015201, filed on Apr. 11, 2018.

(30) Foreign Application Priority Data

Apr. 12, 2017    (JP) .............................. JP2017-078864

(51) Int. Cl.
*B60L 50/16* (2019.01)
*B60W 10/06* (2006.01)
*B60W 10/18* (2012.01)
*B60W 10/20* (2006.01)
*B60W 30/12* (2020.01)
(Continued)

(52) U.S. Cl.
CPC ............... *B60L 50/16* (2019.02); *B60L 50/75* (2019.02); *B60W 10/06* (2013.01); *B60W 10/18* (2013.01); *B60W 10/20* (2013.01); *B60W 30/12* (2013.01); *B60W 50/023* (2013.01); *B60W 50/029* (2013.01); *G05D 1/0088* (2013.01); *B60W 2050/0292* (2013.01); *B60W 2510/244* (2013.01); *B60W 2710/06* (2013.01);
(Continued)

(58) Field of Classification Search
CPC ......... B60L 50/16; B60L 50/75; B60W 10/06; B60W 10/18; B60W 10/20; B60W 30/12; B60W 50/923; B60W 50/029; B60W 2050/0292; B60W 2510/244; B60W 2710/06; B60W 2710/18; B60W 2710/20; G05D 1/0088; G05D 2201/0213; Y02T 10/70
See application file for complete search history.

(56) References Cited

U.S. PATENT DOCUMENTS

2007/0247106 A1    10/2007    Kawahara et al.
2017/0008516 A1    1/2017    Itagaki
(Continued)

FOREIGN PATENT DOCUMENTS

CN    105620467 A    6/2016
JP    2000-166017 A    6/2000
(Continued)

*Primary Examiner* — Marthe Y Marc-Coleman
(74) *Attorney, Agent, or Firm* — Oliff PLC

(57) ABSTRACT

A travel control apparatus includes a state detection unit that detects whether each of at least three power sources of the autonomous driving system including one or more electricity storage devices and one or more power generators is in a normal state or in a malfunctioning state; and a mode setting unit that sets a fail operation mode corresponding to a type of at least one of the power sources upon determination that the at least one of the power sources is in the malfunctioning state.

12 Claims, 37 Drawing Sheets

(51) Int. Cl.
  *B60W 50/023* (2012.01)
  *B60W 50/029* (2012.01)
  *G05D 1/00* (2006.01)
  *B60L 50/75* (2019.01)

(52) U.S. Cl.
  CPC ..... *B60W 2710/18* (2013.01); *B60W 2710/20* (2013.01); *G05D 2201/0213* (2013.01)

(56) References Cited

U.S. PATENT DOCUMENTS

| | | |
|---|---|---|
| 2018/0001850 A1 | 1/2018 | Kontani |
| 2018/0029474 A1* | 2/2018 | Berels .................... B60L 58/21 |
| 2018/0201187 A1* | 7/2018 | Yellambalase ........ B60L 3/0023 |

FOREIGN PATENT DOCUMENTS

| | | |
|---|---|---|
| JP | 2007-129799 A | 5/2007 |
| JP | 2011-041386 A | 2/2011 |
| JP | 2012-213301 A | 11/2012 |
| JP | 2013-169917 A | 9/2013 |
| JP | 2016-130105 A | 7/2016 |
| JP | 2016-215677 A | 12/2016 |
| JP | 2017-022880 A | 1/2017 |

\* cited by examiner

FIG.36

| | A | B | C | D | E | F | G | REMARKS |
|---|---|---|---|---|---|---|---|---|
| | AFTER DETECTING MALFUNCTION | ELECTRICITY STORAGE AND POWER GENERATION ARE AVAILABLE | ONLY ELECTRICITY STORAGE WHEN MULTIPLE MALFUNCTIONS OCCUR | ONLY ELECTRICITY STORAGE | ONLY POWER GENERATION WHEN MULTIPLE MALFUNCTIONS OCCUR | ONLY POWER GENERATION | LOSS OF POWER SOURCE | |
| <SET THRESHOLD VALUE> | | | | | | | | |
| PROVIDE SPEED UPPER LIMIT | | | | | APPLICABLE | APPLICABLE | | WHEN ONLY POWER GENERATION IS AVAILABLE, PREPARE SO THAT IT IS SAFE WHENEVER POWER GENERATION STOPS |
| <DECREASE FUNCTIONS> | | | | | | | | |
| RESTRICT DISTANCE THAT CAN BE TRAVELED BY AUTONOMOUS DRIVING | APPLICABLE | | | | | | | |
| INCREASE FOLLOWING DISTANCE WHEN FOLLOWING CAR AHEAD | APPLICABLE | | | | | | | |
| PERMIT PARTIAL AUTONOMOUS DRIVING | APPLICABLE | | | | | | | |
| LIMIT ROAD ON WHICH VEHICLE CAN TRAVEL | APPLICABLE | | | | | | | |
| LIMIT DESTINATION | APPLICABLE | | | | | | | |
| PROHIBIT DRIVER FROM TAKING HANDS OFF STEERING WHEEL | APPLICABLE | | | | | | | |
| PROHIBIT OUTPUTTING DRIVE FORCE | APPLICABLE | | | | | | | |
| PROHIBIT OPERATION AFTER STOPPING | | | APPLICABLE | APPLICABLE | APPLICABLE | APPLICABLE | APPLICABLE | POSSIBILITY OF LOSS OF ELECTRIC POWER |
| STOP LOAD UNNECESSARY FOR LIMP-HOME MODE | | | APPLICABLE | APPLICABLE | | | APPLICABLE | IT IS UNNECESSARY TO STOP IF POWER IS GENERATED AND ELECTRICITY IS PROVIDED |
| <OUTPUT WARNING (RESTRICT COMFORT OF DRIVER)> | | | | | | | | |
| CONTINUE TO GIVE ALARM, DISPLAY, MESSAGE INDICATING MALFUNCTION TO DRIVER AND SURROUNDING VEHICLES | | | APPLICABLE | APPLICABLE | APPLICABLE | APPLICABLE | APPLICABLE | INFORM IF TRAVELING BEHAVIOR OF MALFUNCTIONING STATE WILL TAKE PLACE SUCH AS WHEN VEHICLE WILL BE STOPPED OR SLOWED DOWN |
| INDICATE MEASURES TO DRIVER | | APPLICABLE | APPLICABLE | APPLICABLE | APPLICABLE | APPLICABLE | APPLICABLE | INDICATE MEASURES CORRESPONDING TO MALFUNCTIONING PORTION |

FIG.37

| | A | B | C | D | E | F | G | |
|---|---|---|---|---|---|---|---|---|
| | AFTER DETECTING MALFUNCTION | ELECTRICITY STORAGE AND POWER GENERATION ARE AVAILABLE | ONLY ELECTRICITY STORAGE WHEN MULTIPLE MALFUNCTIONS OCCUR | ONLY ELECTRICITY STORAGE | ONLY POWER GENERATION WHEN MULTIPLE MALFUNCTIONS OCCUR | ONLY POWER GENERATION | LOSS OF POWER SOURCE | REMARKS |
| ‹SET THRESHOLD VALUE› | | | | | | | | |
| PROVIDE SPEED UPPER LIMIT | APPLICABLE | | | | | | | RESTRICT IF MALFUNCTION OCCURS EVEN IS VEHICLE CAN TRAVEL AS NORMAL |
| RESTRICT DISTANCE THAT CAN BE TRAVELED BY AUTONOMOUS DRIVING | APPLICABLE | | | | | | | |
| INCREASE FOLLOWING DISTANCE WHEN FOLLOWING CAR AHEAD | APPLICABLE | | | | | | | |
| ‹DECREASE FUNCTIONS› | | | | | | | | |
| PERMIT PARTIAL AUTONOMOUS DRIVING | APPLICABLE | | | | | | | |
| LIMIT ROAD ON WHICH VEHICLE CAN TRAVEL | APPLICABLE | | | | | | | |
| LIMIT DESTINATION | APPLICABLE | | | | | | | |
| PROHIBIT DRIVER FROM TAKING HANDS OFF STEERING WHEEL | APPLICABLE | | | | | | | |
| PROHIBIT OUTPUTTING DRIVE FORCE | APPLICABLE | | | | | | | |
| PROHIBIT OPERATION AFTER STOPPING | APPLICABLE | | | | | | | |
| STOP LOAD UNNECESSARY FOR LIMP-HOME MODE | APPLICABLE | | | | | | | |
| ‹OUTPUT WARNING (RESTRICT COMFORT OF DRIVER)› | | | | | | | | |
| CONTINUE TO GIVE ALARM, DISPLAY, MESSAGE INDICATING MALFUNCTION TO DRIVER AND SURROUNDING VEHICLES | APPLICABLE | | | | | | | INFORM SURROUNDING VEHICLES IF MALFUNCTION OCCURS |
| INDICATE MEASURES TO DRIVER | APPLICABLE | | | | | | | INDICATE MEASURES THAT CAN BE TAKEN REGARDLESS OF MALFUNCTIONING PORTION (SUCH AS SIMULTANEOUSLY DISPLAYING CONTACT INFORMATION OF WRECKER SERVICE AND DEALER) | ism # TRAVEL CONTROL APPARATUS

CROSS-REFERENCE TO RELATED APPLICATION

The present application is a continuation application of International Application No. PCT/JP2018/015201, filed Apr. 11, 2018, which claims priority to Japanese Patent Application No. 2017-078864 filed Apr. 12, 2017. The contents of these applications are incorporated herein by reference in their entirety.

BACKGROUND

Technical Field

The present disclosure relates to a travel control apparatus applied to a vehicle autonomous driving system.

Background Art

In a conventional technology, fails of electricity storage devices is detected, and the connection state between a drive unit and the electricity storage devices is changed in accordance with the detected state of the failure of the electricity storage devices.

SUMMARY

The present disclosure is a travel control apparatus applied to a vehicle autonomous driving system. The travel control apparatus to be applied to an autonomous driving system for a vehicle, the travel control apparatus comprising: a state detection unit that detects whether each of at least three power sources of the autonomous driving system including one or more electricity storage devices and one or more power generators is in a normal state or in a malfunctioning state; and a mode setting unit that sets a fail operation mode corresponding to a type of at least one of the power sources upon determination that the at least one of the power sources is in the malfunctioning state.

BRIEF DESCRIPTION OF THE DRAWINGS

FIG. 36 is a table for describing the fail operation mode;
and
FIG. 37 is a table for describing the fail operation mode.

DETAILED DESCRIPTION OF THE PREFERRED EMBODIMENTS

Figure 1:
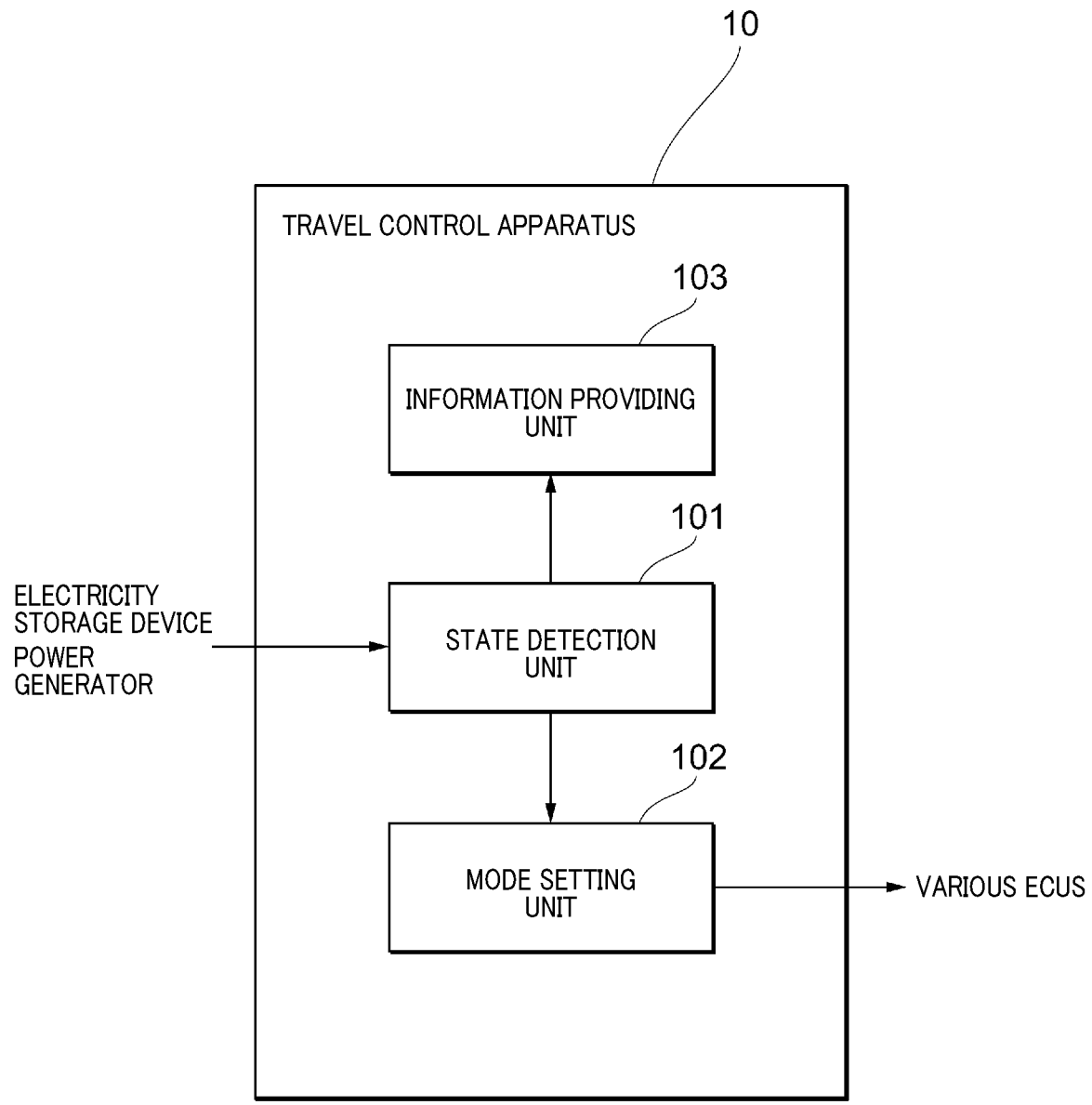
FIG. 1 is a block diagram illustrating a functional structure of a travel control apparatus.

Electrically driven vehicles such as electric cars, hybrid cars, and fuel cell cars are widely used as environmentally-friendly vehicles. Such an electrically-driven vehicle includes an electricity storage device, such as a rechargeable battery and a capacitor, and is driven by drive force generated by the electric power stored in the electricity storage device. Two or more electricity storage devices may be mounted on the electrically-driven vehicle, so that even if one of the electricity storage devices causes fails, the other electricity storage device or other electricity storage devices supply the electric power (refer to PTL 1).

[PTL 1] JP 2011-41386 A

PTL 1 assumes that a vehicle is an electrically-driven vehicle. PTL 1 discloses detecting fails of electricity storage devices and changing the connection state between a drive unit and the electricity storage devices in accordance with the detected state of the failure of the electricity storage devices. More specifically, if fails of being unable to monitor charging and discharging of any of the electricity storage devices occurs, traveling is continued using the failed electricity storage device in accordance with the SOC of the electricity storage device when the failure occurred.

The control method disclosed in PTL 1 does not give consideration to autonomous driving and aims at enhancing the traveling performance of the electrically-driven vehicle that is driven by a driver as much as possible. Thus, in autonomously driving any vehicle, not limited to the electrically-driven vehicle, a completely new solution needs to be provided as measures taken if fails occurs in a power source that contributes to the autonomous driving.

It is an object of the present disclosure to provide a travel control apparatus, to be applied to a vehicle autonomous driving system, and when multiple power sources are provided, the travel control apparatus continues autonomous driving as much as possible even if a malfunction occurs in any of the power sources.

In the present disclosure, since the fail operation mode corresponding to the kind of the power source in the malfunctioning state is set, even if a malfunction occurs in any of the power sources, the autonomous driving is continued as much as possible.

Reference signs in parentheses in "Summary of the Invention" and "CLAIMS" indicate the correspondence to "Description of the Embodiments" described below and do not mean that "Summary of the Invention" and "CLAIMS" are limited to "Description of the Embodiments" described below.

Hereinafter, the present embodiment will be described with reference to the attached drawings. To facilitate illustration, like reference numerals are given to those components that are like the corresponding components in each drawing as much as possible, and redundant descriptions are omitted.

A travel control apparatus of the present embodiment is an electronic control unit (ECU) mounted on an electrically-driven vehicle and is configured to communicate information between other ECUs mounted on the electrically-driven vehicle. The travel control apparatus is configured as a computer including, as hardware components, a computation unit such as a CPU, memories such as a RAM and a ROM, and an interface unit, which transmits and receives data.

Subsequently, the functional components of the control apparatus will be described. As shown in FIG. 1, a travel control apparatus 10 includes, as functional components, a state detection unit 101, a mode setting unit 102, and an information providing unit 103.

At least three or more power sources of the autonomous driving system, which include at least one electricity storage device and at least one power generator, are provided. The state detection unit 101 detects whether each power source is in a normal state or in a malfunctioning state. If the state detection unit 101 detects that at least one of the power sources is in the malfunctioning state, the mode setting unit 102 sets a fail operation mode corresponding to the type of the power source that is in the malfunctioning state. The fail operation mode is a mode for safely continuing autonomous driving if a malfunction occurs in the autonomous driving system. In the present embodiment, since the fail operation mode corresponding to the kind of the power source that is in the malfunctioning state is set, even if a malfunction occurs in any of the power sources, the autonomous driving is continued as much as possible.

Subsequently, the specific manner of setting the fail operation mode will be described. As one manner of setting the fail operation mode, if the state detection unit 101 detects that at least one of the power sources is in the malfunctioning state and that one or more electricity storage devices and one or more power generators are in the normal state, the mode setting unit 102 sets the fail operation mode that causes the power generator in the normal state to be driven so that the SOC of the electricity storage device in the normal state becomes higher than that during normal operation. When one or more electricity storage devices and one or more power generators are in the normal state, autonomous driving can be continued even if a malfunction occurs in another power source. However, if the electricity storage device and the power generator that are currently in the normal state make a transition to the malfunctioning state, it is assumed that the continuation of safe autonomous driving may possibly become difficult due to the insufficient amount of electricity. For this reason, although the SOC of the electricity storage device is normally maintained to a certain level or less to prevent overcharging, the power generator is continued to be driven with the SOC being kept to be higher than that during the normal operation, so that electric power is reliably provided to continue autonomous driving until a safer state is achieved.

As one manner of setting the fail operation mode, if the state detection unit 101 detects that at least one normal power source capable of supplying electric power to at least one of functional modules necessary for the autonomous driving is only at least one electricity storage device or at least one power generator, the mode setting unit 102 determines a setting of the fail operation mode for the case of only at least one electricity storage device being normal to be different from a setting of the fail operation mode for the case of only at least one power generator being normal.

The electricity storage device can continuously supply electric power since it is difficult for mechanical problems to occur, but the amount of electricity that can be supplied is limited as a trade-off. The power generator can continuously supply electric power as long as fuel is supplied, but if a high load is applied, the power generator may stop generating power or cause a great voltage fluctuation as a trade-off. The autonomous driving can be continued by setting the fail operation mode in accordance with such properties of the electricity storage device and the power generator.

As one manner of setting the fail operation mode, if the state detection unit 101 detects that at least one normal power source capable of supplying electric power to at least one of functional modules necessary for the autonomous driving is only at least one electricity storage device, the mode setting unit 102 sets the fail operation mode in accordance with the SOC of the electricity storage device in the normal state. If at least one normal power source is only at least one electricity storage device, although it is possible to continue the autonomous driving, the autonomous driving can no longer be continued when the stored electricity of the electricity storage device is exhausted. Thus, appropriate measures are taken within the range in which the autonomous driving can be continued by setting the fail operation mode in accordance with the SOC of the electricity storage device.

As one manner of setting the fail operation mode in accordance with the SOC of the electricity storage device, if the SOC of the electricity storage device in the normal state is greater than the amount of electricity necessary for changing the lane planned based on the state of the surrounding vehicles, that is, it is possible to change the lane, the mode setting unit 102 causes the vehicle to be moved to the lane close to the road shoulder. If the SOC of the electricity storage device in the normal state is less than the amount of electricity necessary for changing the lane, that is, it is impossible to change the lane, the mode setting unit 102 keeps the vehicle in the lane. In this manner, if the SOC of the electricity storage device in the normal state is in a state that allows lane changing, the vehicle is moved to the lane closest to the road shoulder. Thus, if a malfunction further occurs, the vehicle can be guided to a safer place. The safe place includes, in order of decreasing precedence, a stopping lane, a road shoulder, a lane close to the road shoulder, and a passing lane. Since the vehicle is moved to the lane close to the road shoulder, the distance to the safe place is shortened. Thus, autonomous driving that ensures safety can be continued.

As one manner of setting the fail operation mode in accordance with the SOC of the electricity storage device, the mode setting unit 102 prevents starting of the engine mounted on the vehicle. Since only one or more electricity storage devices are in the normal state, even if the engine is is instructed to start, the power generator cannot generate power. Since the starting of the engine consumes electric power, unnecessary power consumption is reduced by preventing the starting of the engine. One manner of preventing the starting of the engine includes prohibiting the starting of the engine. Another manner of preventing the starting of the engine includes prohibiting the starting of the engine for the purpose of generating power. With an electricity storage device having a large capacity such as that in a plug-in hybrid vehicle, rather than reducing the power consumed by the starting of the engine, the starting of the engine for purposes other than power generation, such as driving force and heating may be permitted to allow the movement to a safe place and to improve the view and the convenience.

As one manner of setting the fail operation mode in accordance with the SOC of the electricity storage device, the mode setting unit 102 stops supplying electric power to loads unnecessary for limp-home mode of the electrically-driven vehicle performed by the autonomous driving system.

Stopping the power supply to the loads unnecessary for limp-home mode of the electrically-driven vehicle performed by the autonomous driving system, such as an air-conditioner and an audio device, extends the traveling distance of the evasive maneuver performed by the autonomous driving.

As one manner of setting the fail operation mode in accordance with the SOC of the electricity storage device, if there is only one electricity storage device in the normal state or if the total amount of the SOC of the electricity storage devices in the normal state is less than a predetermined amount, the mode setting unit 102 stops the vehicle at a place that ensures safety and to which the vehicle can be moved, which is estimated based on the SOC of the electricity storage device or devices in the normal state. If only one electricity storage device is available in the normal state, redundancy is lost, and if that electricity storage device makes a transition to the malfunctioning state, autonomous driving can no longer be continued. If the total amount of the SOC of the electricity storage devices in the normal state is reduced to such an amount that autonomous driving cannot be continued, autonomous driving can no longer be performed even if there is redundancy. Since the electricity storage device is unlikely to cause a mechanical fault and can continuously supply electric power, the autonomous driving is preferably continued under certain conditions. In the above manner, the vehicle is guided to a safer place by permitting autonomous driving until the vehicle is stopped at a place that ensures safety and to which the vehicle can be moved, which is estimated based on the SOC of the electricity storage device or devices in the normal state, or by providing a threshold value at which measures are taken to stop the vehicle before the SOC becomes too low to allow stopping the vehicle at a place that ensures safety.

As one manner of setting the fail operation mode, if the state detection unit 101 detects that at least one normal power source capable of supplying electric power to at least one of functional modules necessary for the autonomous driving is only at least one power generator, the mode setting unit 102 restricts the vehicle speed or the operation of devices with a high electrical load, while continuing to generate power by the power generator(s). If all the electricity storage devices that supply electric power to the functional-module groups necessary for the autonomous driving except back-up electricity storage devices that supply electric power to individual components are in a malfunction state, and at least one normal power source is only at least one power generator, although the autonomous driving can be continued, generation of power may stop or a great voltage fluctuation may occur due to the application of a high load. For this reason, the vehicle speed or the operation of the devices with a high electrical load is restricted, so that the voltage is inhibited from undesirably dropping or the power generation is inhibited from being undesirably stopped, and the autonomous driving can be continued.

The following also describes one manner of setting the fail operation mode when only at least one power generator is in the normal state.

If the state detection unit 101 detects that at least one normal power source capable of supplying electric power to at least one of functional modules necessary for the autonomous driving is only at least one power generator, the mode setting unit 102 is configured to restrict the steering angle speed or prevent execution of a load required to output braking force from execution of another high load while causing the at least one normal power source to generate the electric power.

Since steering and braking may increase the load due to the operation of the motor, restricting the steering and the braking prevents the power generation from being undesirably stopped, and autonomous driving can be continued.

As one manner of setting the fail operation mode, the state detection unit 101 and the mode setting unit 102 each execute a predetermined process when the autonomous driving is started. If a malfunction occurs in any of the power sources during manual driving, the driving mode is smoothly shifted to autonomous driving even if a driver becomes concerned due to the execution of the processes described above when the autonomous driving is started.

The information providing unit 103 provides information corresponding to the malfunctioning state if the state detection unit 101 detects the malfunctioning state. More specifically, if the vehicle is capable of continuing to travel even if a malfunction occurs, information regarding shops capable of repairing the vehicle, such as a dealer, is provided. If it is difficult to continue traveling and the vehicle will have to stop, information regarding a wrecker service is provided.

Figure 2:
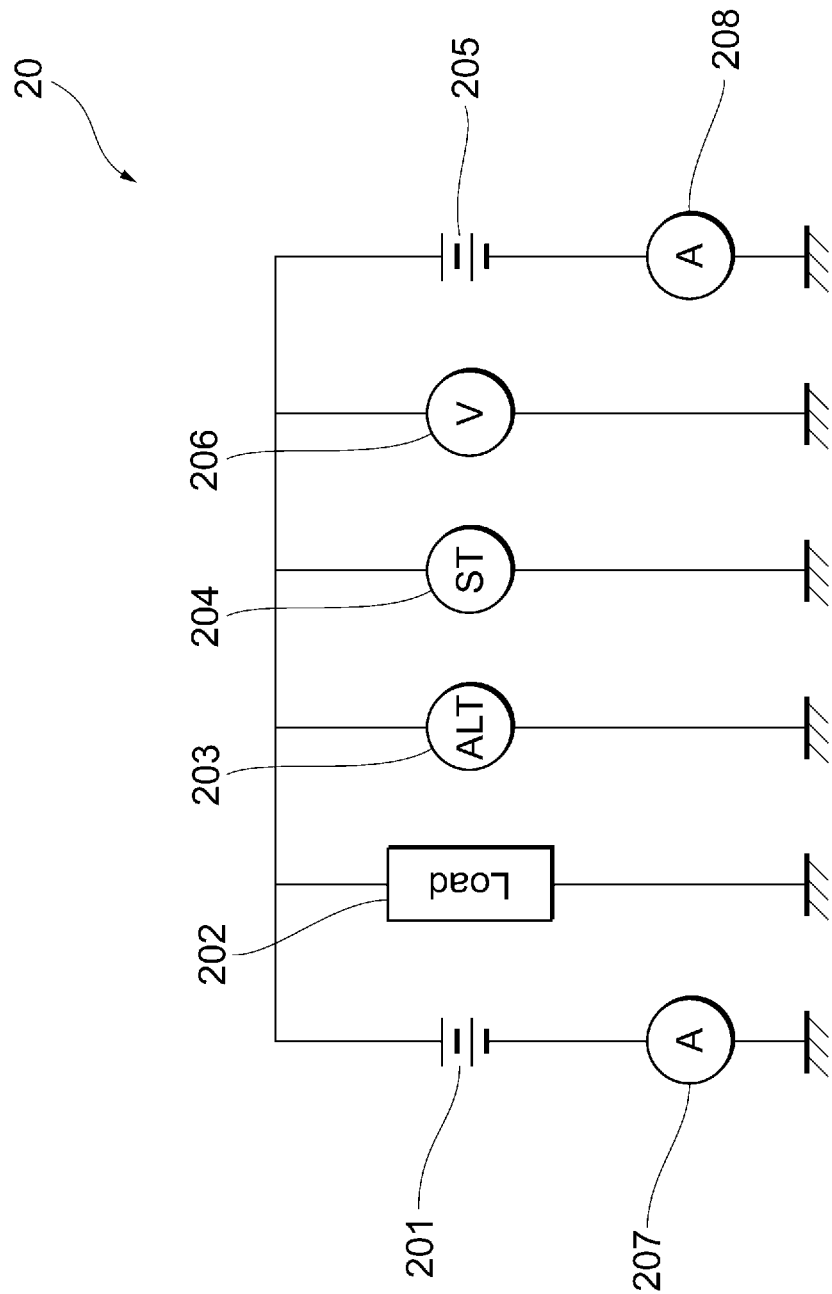
FIG. 2 is a diagram for describing one example of an autonomous driving system controlled by the travel control apparatus.
Figure 3:
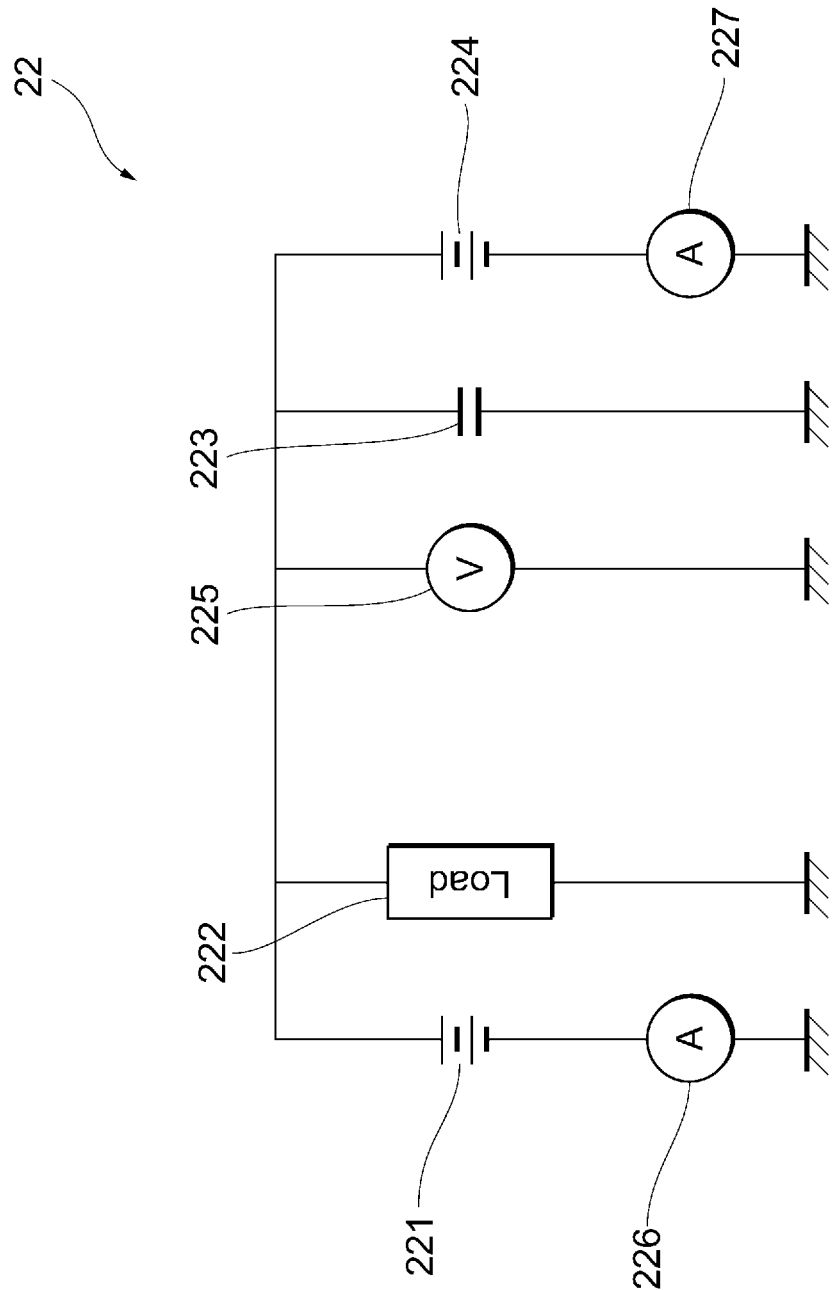
FIG. 3 is a diagram for describing one example of the autonomous driving system controlled by the travel control apparatus.
Figure 4:
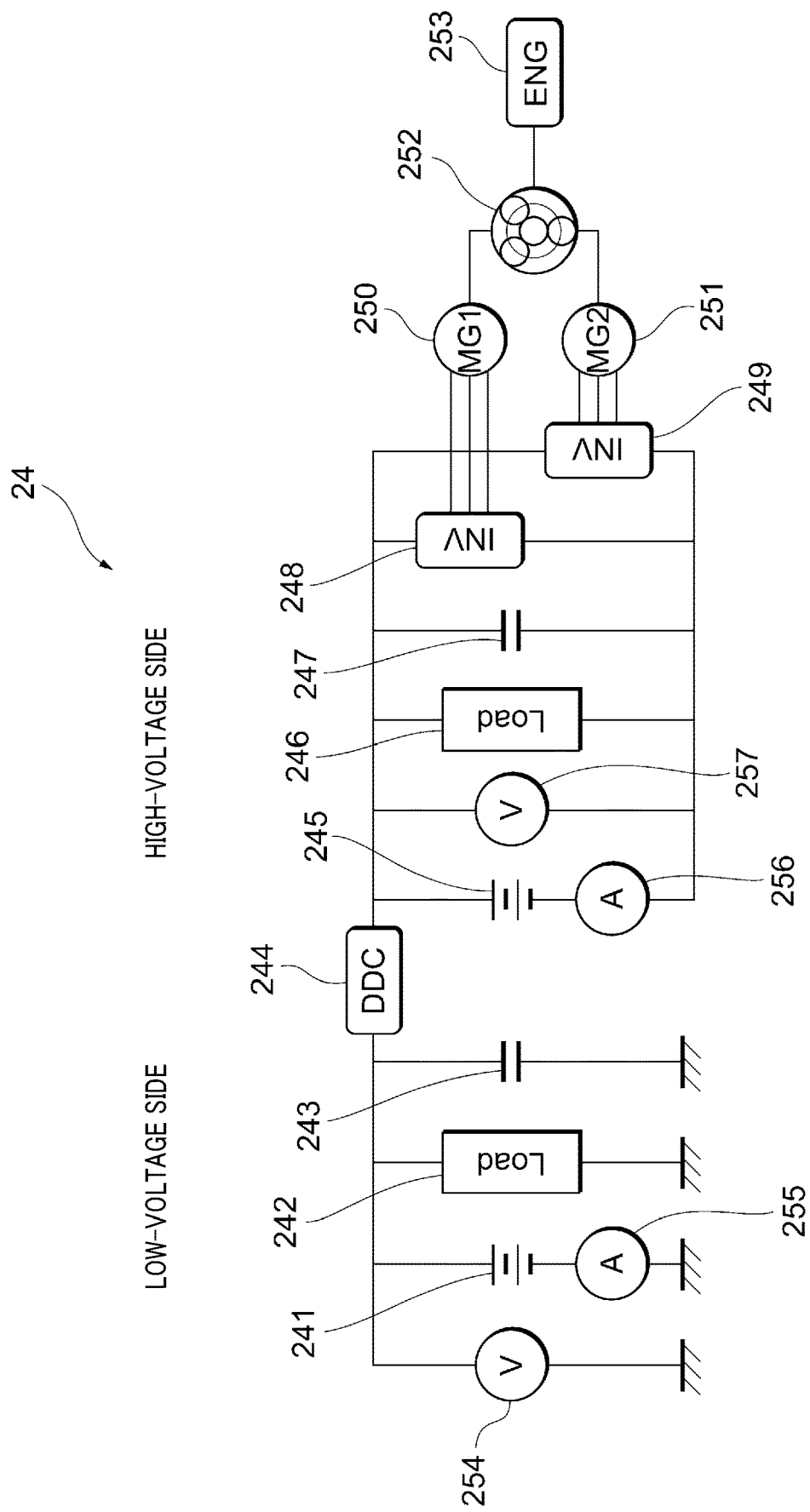
FIG. 4 is a diagram for describing one example of the autonomous driving system controlled by the travel control apparatus.

Subsequently, one example of a power system configuration in the autonomous driving system that is controlled by the travel control apparatus 10 will be described with reference to FIGS. 2, 3, and 4. FIGS. 2, 3, and 4 are diagrams for describing the example of the power system configuration of the power sources and the load(s) used in the autonomous driving system.

A power system configuration 20 shown in FIG. 2 includes an electricity storage device 201, a load 202, an alternator 203, a starter motor 204, and an electricity storage device 205. The power system configuration 20 further includes a voltmeter 206, an ammeter 207, and an ammeter 208. The power system configuration 20 is applied to a vehicle driven by a non-illustrated engine.

A power system configuration 22 shown in FIG. 3 includes an electricity storage device 221, a load 222, a capacitor 223, and an electricity storage device 224. The power system configuration 22 further includes a voltmeter 225, an ammeter 226, and an ammeter 227. The power system configuration 22 is applied to an electrically-driven vehicle driven by a non-illustrated motor.

A power system configuration 24 shown in FIG. 4 includes a low-voltage circuit and a high-voltage circuit, which are connected to each other through a DC/DC converter 244. The low-voltage circuit includes an electricity storage device 241, a load 242, a capacitor 243, a voltmeter 254, and an ammeter 255. The high-voltage circuit includes an electricity storage device 245, a load 246, a capacitor 247, an inverter 248, an inverter 249, an ammeter 256, and a voltmeter 257.

The inverter 248 is connected to a power generator, which is a motor generator 250 in this embodiment. The motor generator 250 is used for generating power and power running. The inverter 249 is connected to a motor generator 251. The motor generator 251 is used for power running and regeneration. The motor generator 250 and the motor generator 251 are connected to an engine 253 through a planetary gear 252. The power system configuration 24 is applied to a hybrid vehicle.

Figure 5:
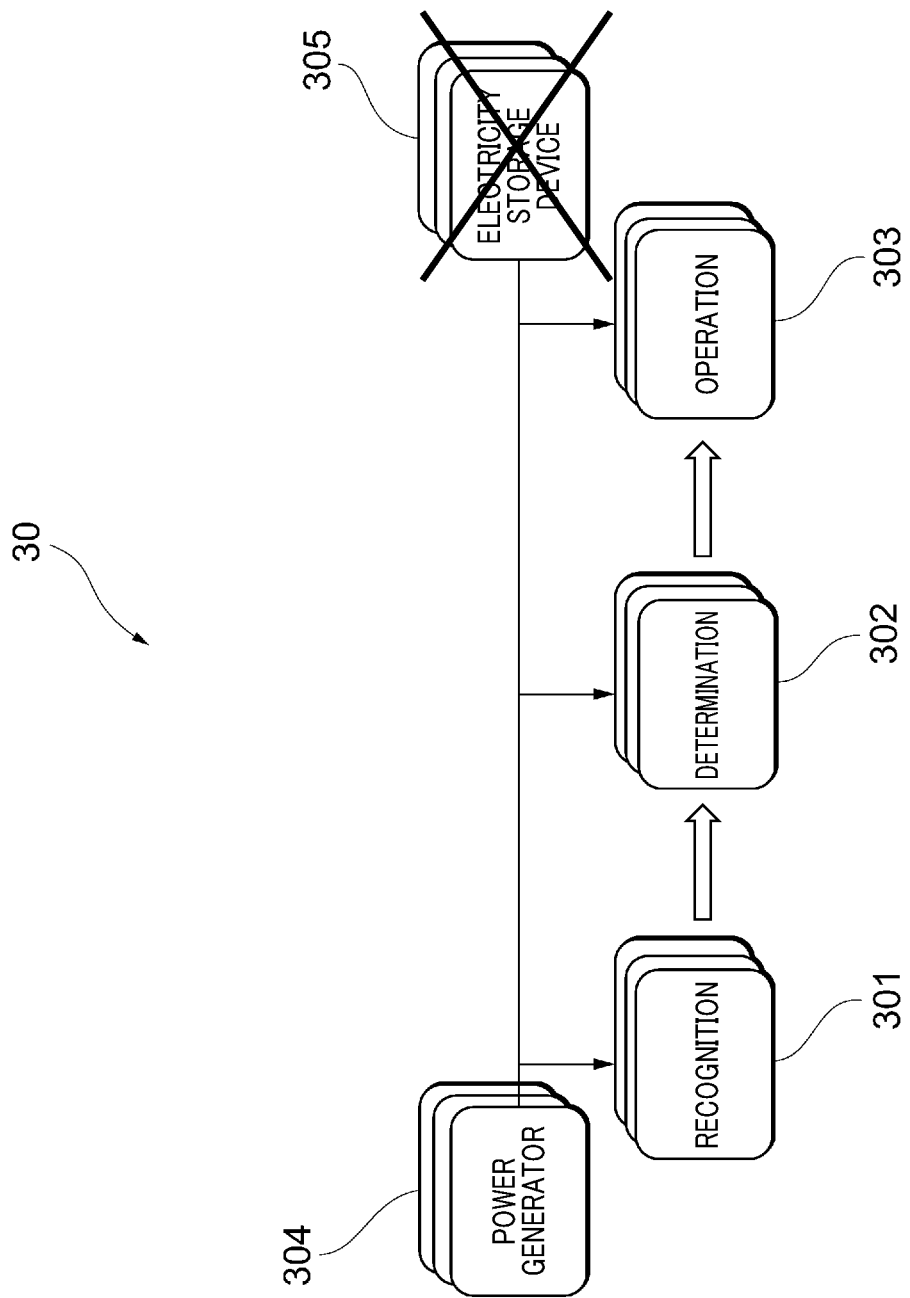
FIG. 5 is a diagram for describing one example of the autonomous driving system controlled by the travel control apparatus.
Figure 6:
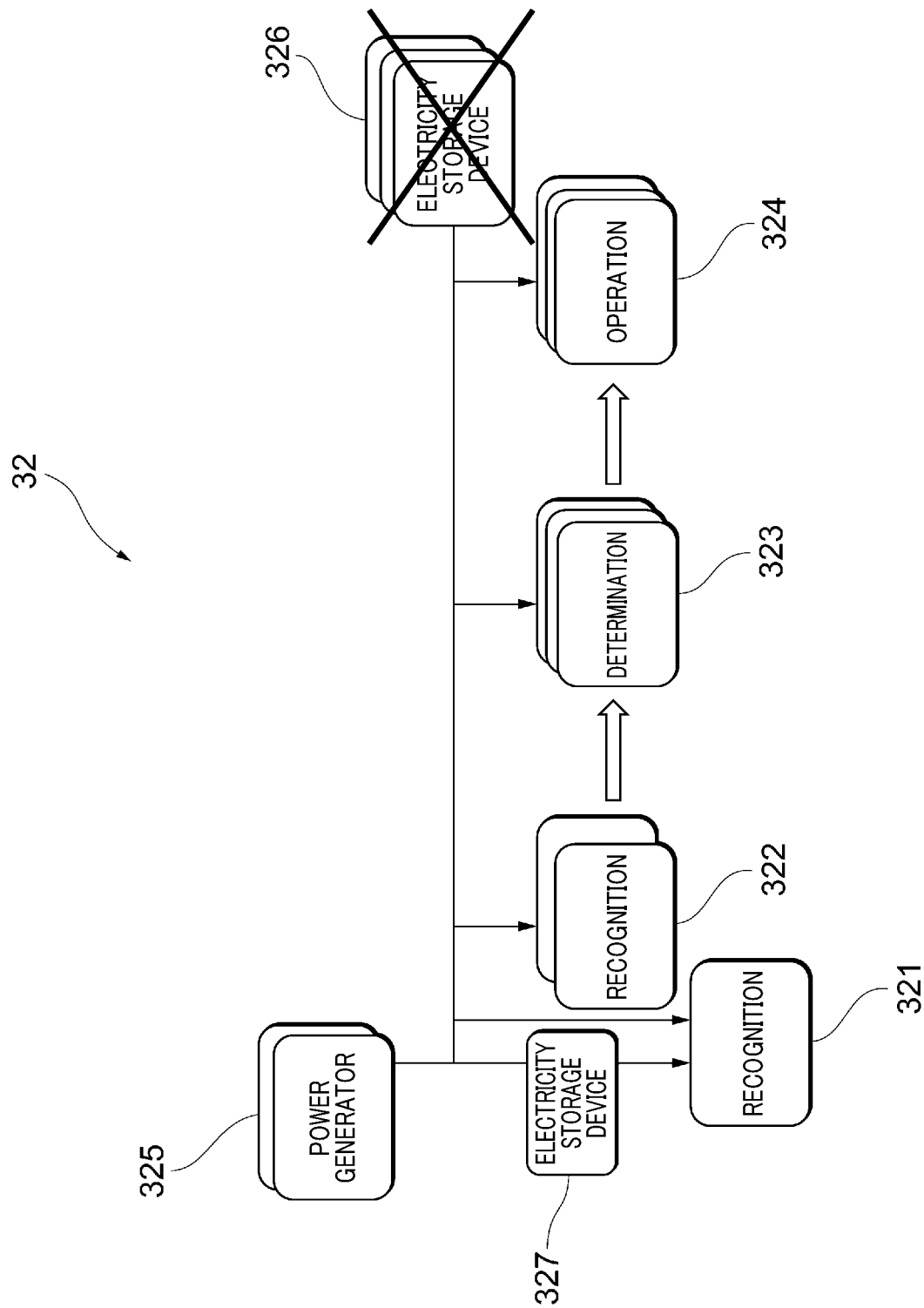
FIG. 6 is a diagram for describing one example of the autonomous driving system controlled by the travel control apparatus.
Figure 7:
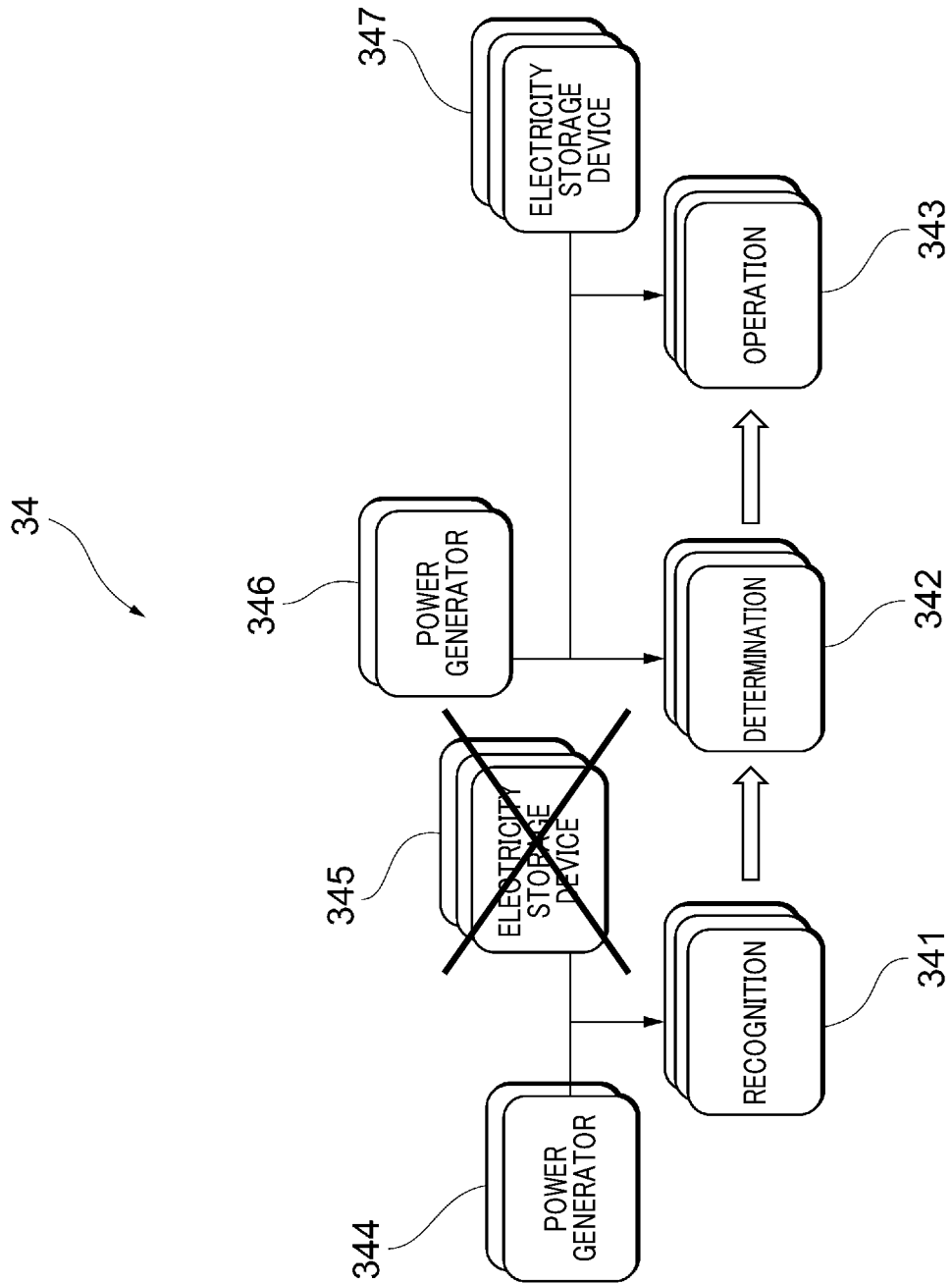
FIG. 7 is a diagram for describing one example of the autonomous driving system controlled by the travel control apparatus.

Subsequently, one example of the autonomous driving system controlled by the travel control apparatus 10 will be described with reference to FIGS. 5, 6, and 7. FIGS. 5, 6, and 7 are diagrams for describing the case in which all the electricity storage devices are determined to be malfunctioning in supplying power to the autonomous driving system.

An autonomous driving system 30 shown in FIG. 5 includes a recognition functional-module group 301, a determination functional-module group 302, an operation functional-module group 303, power generators 304, and electricity storage devices 305. The recognition functional-module group 301, the determination functional-module group 302, and the operation functional-module group 303 configure the functional-module groups necessary for autonomous driving.

The recognition functional-module group 301 includes, for example, a camera device, a millimeter-wave device, a LIDAR device, a sonar, and the like. The information recognized by the recognition functional-module group 301 is output to the determination functional-module group 302. The determination functional-module group 302 includes various ECUs. The information determined by the determination functional-module group 302 is output to the operation functional-module group 303. The operation functional-module group 303 includes an electric brake, an electric steering device, and engine-related devices.

The recognition functional-module group 301, the determination functional-module group 302, and the operation functional-module group 303 receive electric power from the power generators 304 and the electricity storage devices 305. If all the electricity storage devices 305 are brought into the malfunctioning state, the state detection unit 101 determines that all the electricity storage devices are in the malfunctioning state.

An autonomous driving system 32 shown in FIG. 6 includes recognition functional-module groups 321 and 322, a determination functional-module group 323, an operation functional-module group 324, power generators 325, and electricity storage devices 326 and 327. The recognition functional-module groups 321 and 322, the determination functional-module group 323, and the operation functional-module group 324 configure the functional-module groups necessary for autonomous driving.

The recognition functional-module group 321 includes a camera device. The recognition functional-module group 322 includes, for example, a millimeter-wave device, a LIDAR device, a sonar, and the like. The information recognized by the recognition functional-module groups 321 and 322 is output to the determination functional-module group 323. The determination functional-module group 323 includes various ECUs. The information determined by the determination functional-module group 323 is output to the operation functional-module group 324. The operation functional-module group 324 includes an electric brake, electric steering device, and engine-related devices.

The recognition functional-module groups 321 and 322, the determination functional-module group 323, and the operation functional-module group 324 receive electric power from the power generators 325 and the electricity storage devices 326. The recognition functional-module group 321 also receives electric power from the electricity storage device 327. The electricity storage device 327 supplies electric power only to the recognition functional-module group 321 and does not supply electric power to other functional-module groups. In this case, if all the electricity storage devices 326 are brought into the malfunctioning state, the state detection unit 101 determines that all the electricity storage devices are in the malfunctioning state.

An autonomous driving system 34 shown in FIG. 7 includes a recognition functional-module group 341, a determination functional-module group 342, an operation functional-module group 343, power generators 344, electricity storage devices 345, power generators 346, and electricity storage devices 347. The recognition functional-module group 341, the determination functional-module group 342, and the operation functional-module group 343 configure the functional-module groups necessary for autonomous driving. Since the functions of the functional-module groups are equivalent to those of the recognition functional-module group 301, the determination functional-module group 302, and the operation functional-module group 303 described with reference to FIG. 5, individual descriptions thereof are omitted.

The recognition functional-module group 341 receives electric power from the power generators 344 and the electricity storage devices 345. The determination functional-module group 342 and the operation functional-module group 343 receive electric power from the power generators 346 and the electricity storage devices 347. The power supply system including the power generators 344 and the electricity storage devices 345, and the power supply system including the power generators 346 and the electricity storage devices 347 are separate from each other, and supply electric power to only the functional-module group or the functional-module groups that each power supply system is in charge of. In this case, if all the electricity storage devices 345 are in a malfunction state, the state detection unit 101 determines that all the electricity storage devices are in the malfunctioning state. This is because even if the electricity storage devices 347 are in the normal state, the electricity storage devices 347 cannot supply electric power to the recognition functional-module group 341, and the recognition functional-module group 341 will receive electric power from only the power generators 344.

Subsequently, the control process of the travel control apparatus 10 will be described with reference to FIG. 8. At step S101, the state detection unit 101 detects a malfunction in the power sources. At step S102 subsequent to step S101, the information providing unit 103 lights a malfunction indicator lamp (MIL) for indicating the malfunction in the power sources.

At step S103 subsequent to step S102, the state detection unit 101 determines whether at least one of the power sources is in the malfunctioning state, and one or more electricity storage devices and one or more power generators are in the normal state. If one or more electricity storage devices and one or more power generators are in the normal state, the process proceeds to step S104. If one or more electricity storage devices and one or more power generators are not in the normal state, the process proceeds to step S105.

Figure 9:
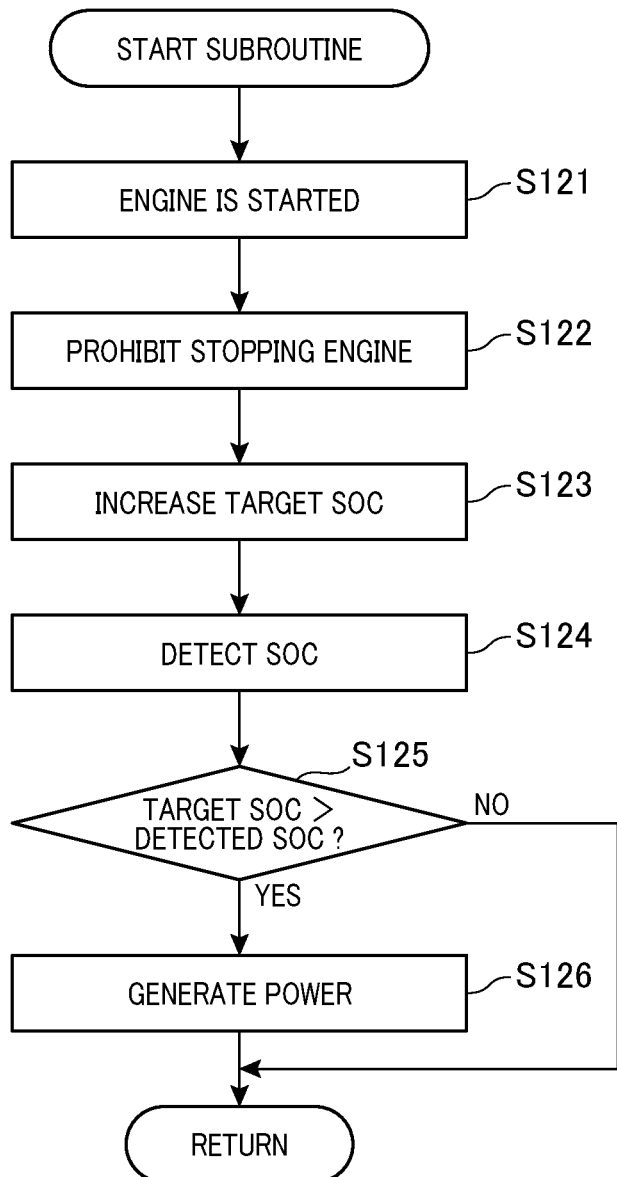
FIG. 9 is a flowchart for describing the fail ope fail operation mode.

At step S104, an electricity storage and power generation process is executed. The electricity storage and power generation process at step S104 will be described with reference to FIG. 9.

At step S121, the mode setting unit 102 starts the engine. At step S122 subsequent to step S121, the mode setting unit 102 prohibits stopping of the engine.

At step S123 subsequent to step S122, the state detection unit 101 increases a target SOC. At step S124 subsequent to step S123, the state detection unit 101 detects the SOC.

At step S125 subsequent to step S124, the state detection unit 101 determines whether the detected SOC is less than the target SOC. If the detected SOC is less than the target SOC, the process proceeds to step S126. If the detected SOC is not less than the target SOC, the process is terminated and returns to the flowchart of FIG. 8.

At step S126, the mode setting unit 102 drives the power generator to generate power and increases the SOC of the electricity storage device. After the process of step S126 is finished, the process returns to the flowchart of FIG. 8.

Figure 8:
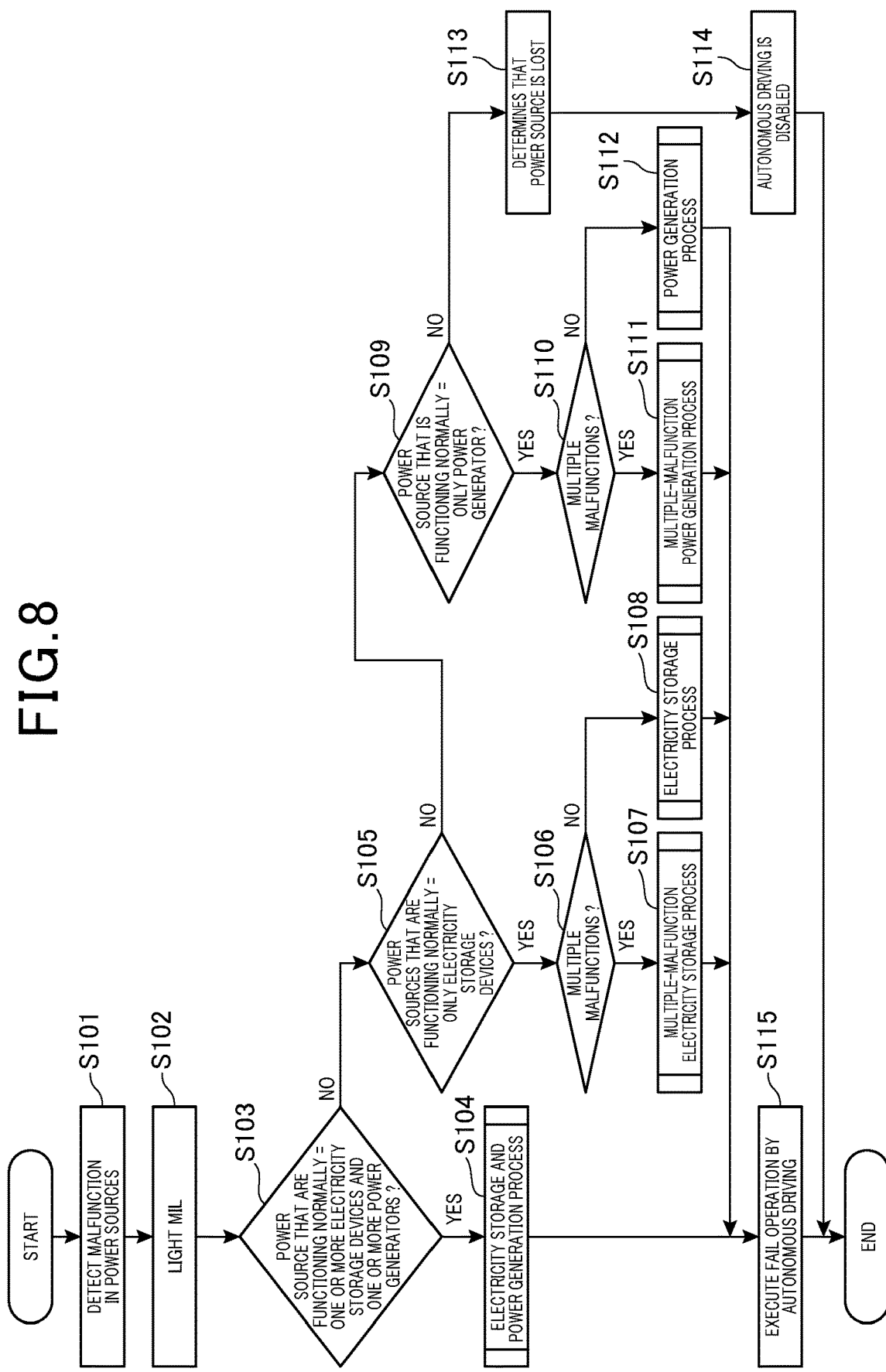
FIG. 8 is a flowchart for describing a fail operation mode.

At step S105 of FIG. 8, the state detection unit 101 determines whether at least one normal power source is only at least one electricity storage device. If at least one normal power source is only at least one electricity storage device, the process proceeds to step S106. If at least one normal power source is not only at least one electricity storage device, the process proceeds to step S109.

At step S106, the state detection unit 101 determines whether two or more electricity storage devices are in the malfunctioning state. If two or more electricity storage devices are in the malfunctioning state, the process proceeds to step S107. If there are not two or more electricity storage devices in the malfunctioning state, the process proceeds to step S108.

At step S107, a multiple-malfunction electricity storage process is executed. The multiple-malfunction electricity storage process of step S107 will be described with reference to FIG. 10. In the state in which the multiple-malfunction electricity storage process is to be executed, all the power generators are in the malfunctioning state, and there are multiple electricity storage devices in the malfunction although at least one normal power source is only at least one electricity storage device. Under the circumstances, the evasive maneuver can be performed using the electricity storage device in the normal state effectively.

Figure 10:
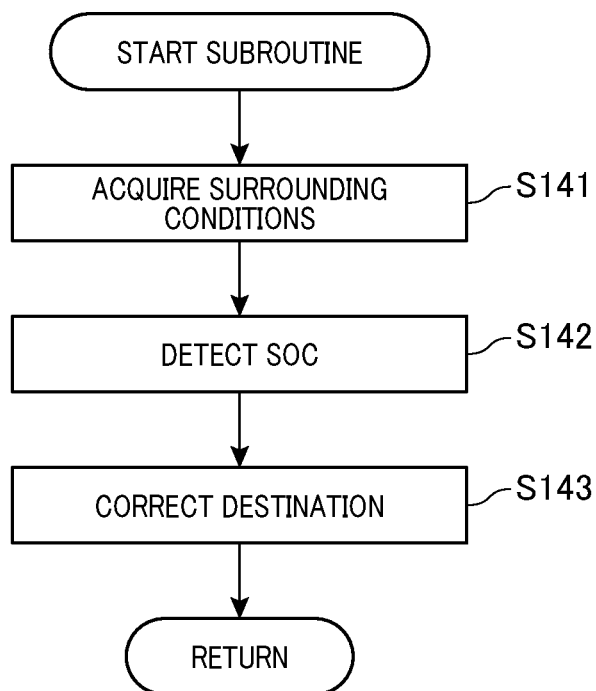
FIG. 10 is a flowchart for describing the fail operation mode.

At step S141 of FIG. 10, the state detection unit 101 acquires the surrounding conditions. At step S142 subsequent to step S141, the state detection unit 101 detects the SOC of the electricity storage device in the normal state. At step S143 subsequent to step S142, the mode setting unit 102 corrects the destination to a safe position in the range movable with the detected SOC. After the process of step S143 is finished, the process returns to the flowchart of FIG. 8.

At step S108, an electricity storage process is executed. The electricity storage process of step S108 will be described with reference to FIGS. 11, 12, 13, 14, 15, 16, 17, 18, and 19.

Figure 11:
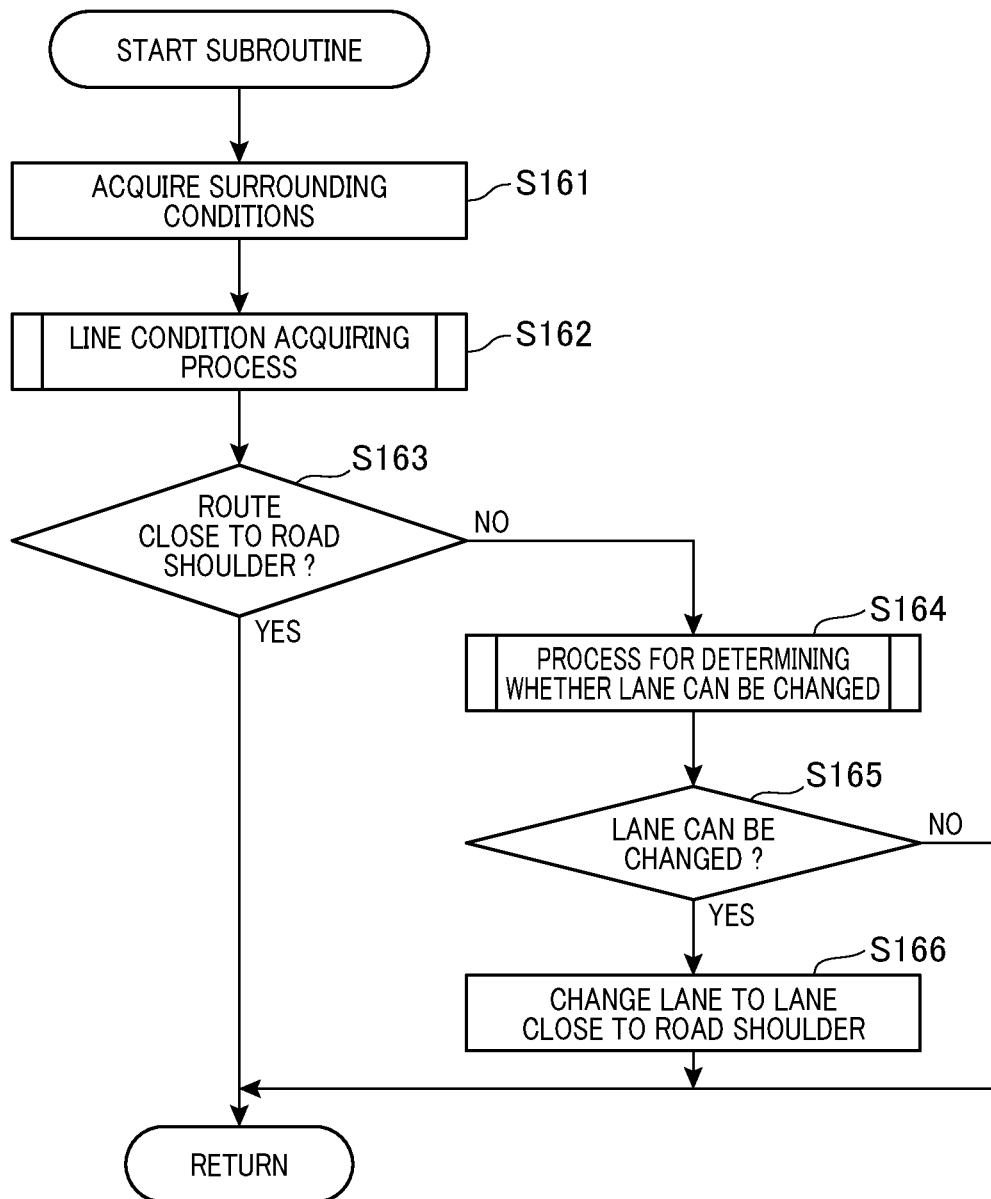
FIG. 11 is a flowchart for describing the fail operation mode.

At step S161 of FIG. 11, the state detection unit 101 acquires the surrounding conditions. At step S162 subsequent to step S161, a route condition acquiring process is executed. The route condition acquiring process of step S162 will be described with reference to FIGS. 12 and 13. FIG. 13 is a diagram illustrating functional components necessary for executing the route condition acquiring process. As shown in FIG. 13, the vehicle on which the travel control apparatus 10 is mounted includes a receiver 131 and a navigation system 132.

Figure 12:
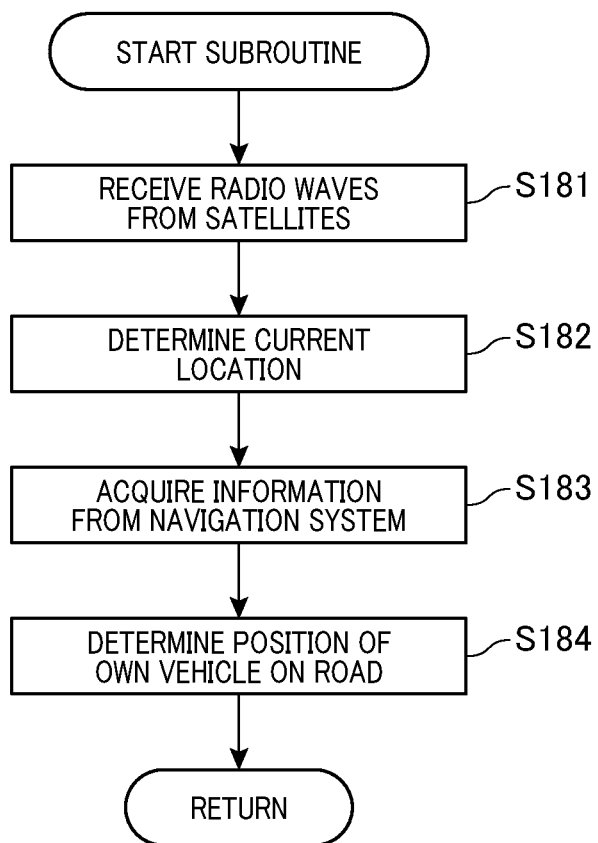
FIG. 12 is a flowchart for describing the fail operation mode.
Figure 13:
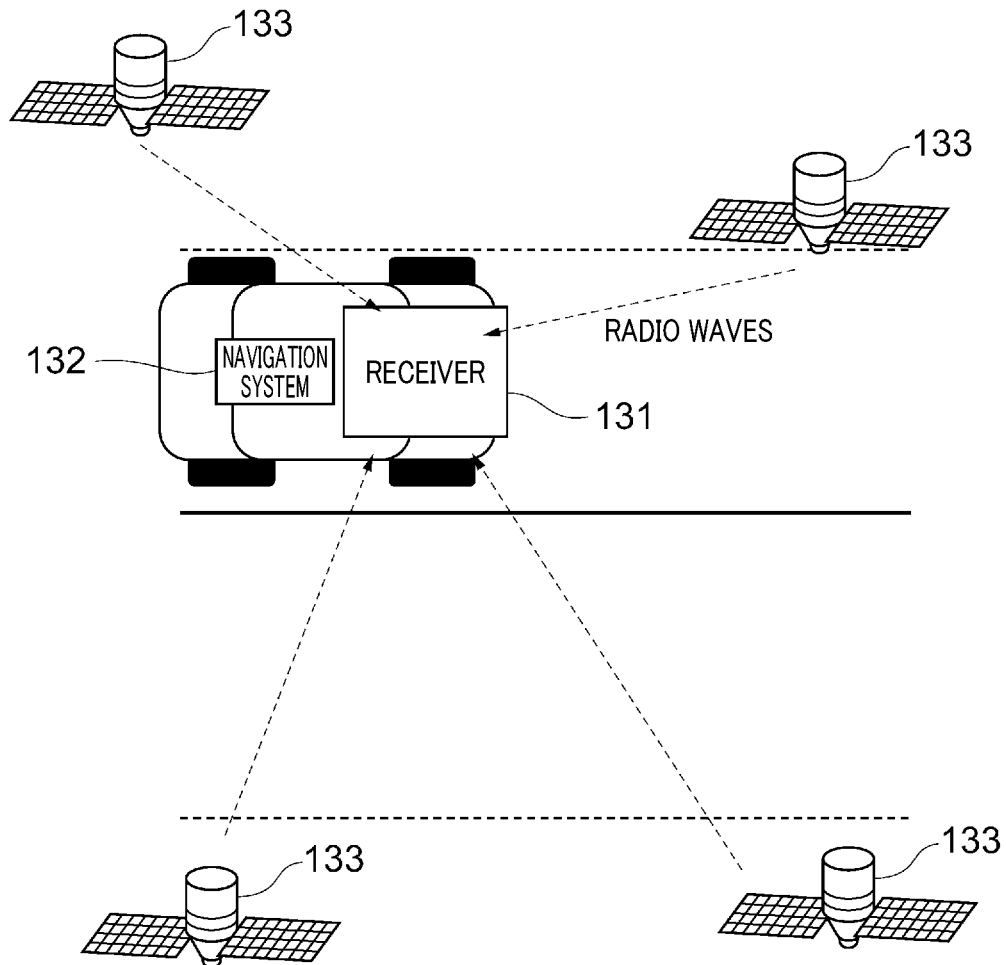
FIG. 13 is a diagram for describing how the position of the own vehicle on a road is determined.

At step S181 of FIG. 12, the receiver 131 receives radio waves transmitted from satellites 133. At step S182 subsequent to step S181, the receiver 131 determines the current location. At step S183 subsequent to step S182, the navigation system 132 acquires map information. The map information includes lane position information and usage information of the lane. At step S184 subsequent to step S183, the position of the own vehicle on the road is determined. When the process of step S184 is finished, the process returns to the flowchart of FIG. 11.

Figure 14:
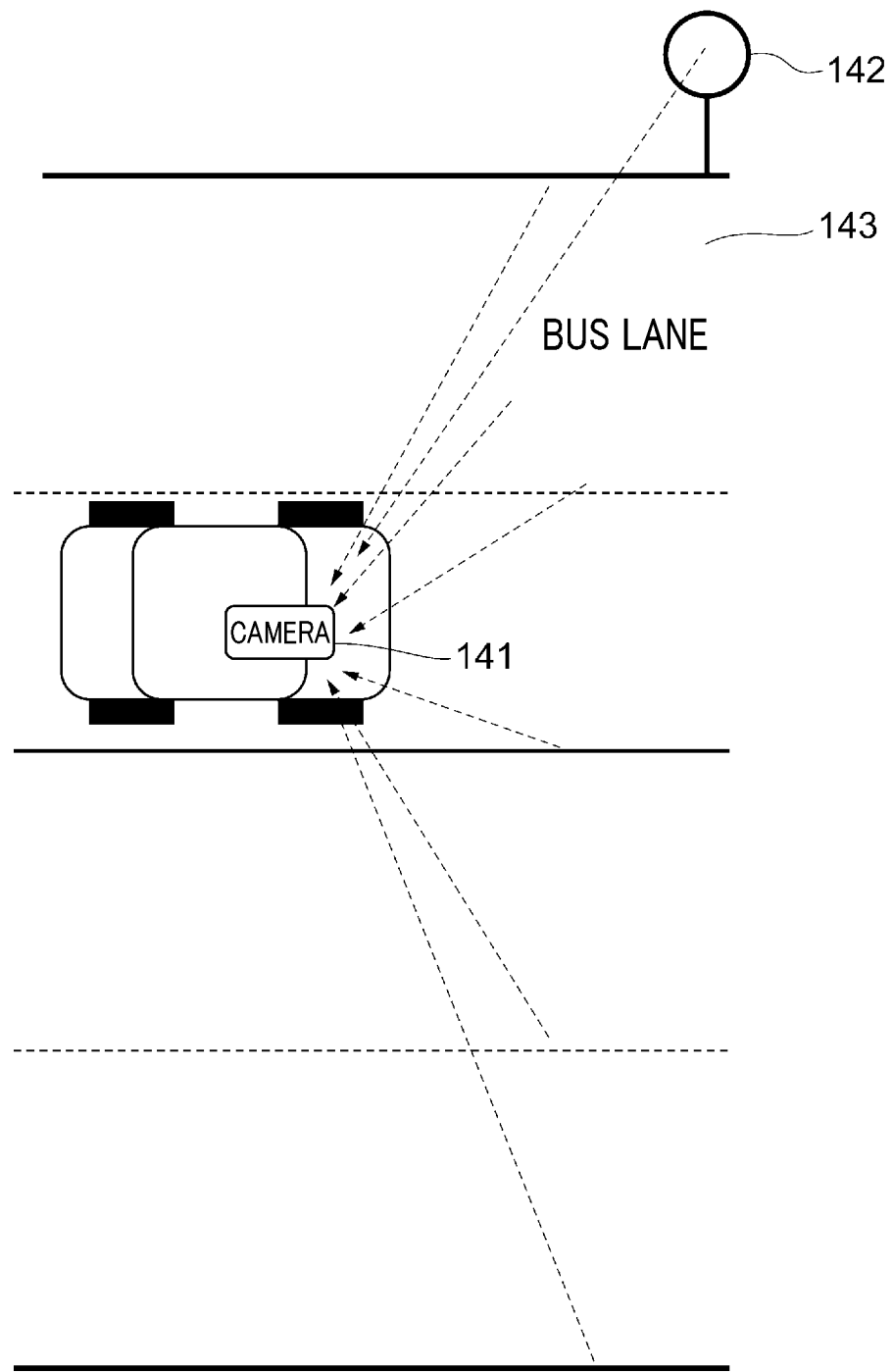
FIG. 14 is a diagram for describing how the position of the own vehicle on a road is determined.
Figure 15:
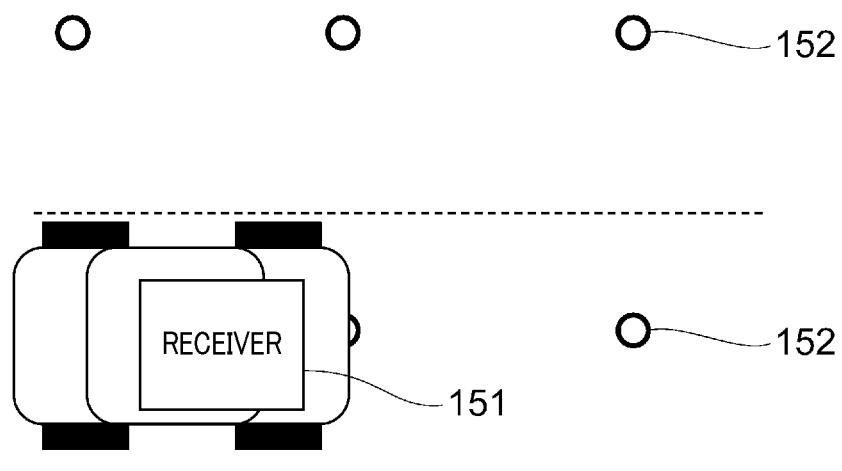
FIG. 15 is a diagram for describing how the position of the own vehicle on a road is determined.

The route condition acquiring process is not limited to the manner described with reference to FIGS. 12 and 13. As shown in FIG. 14, a camera 141 mounted on the vehicle may be used to acquire a piece of lane usage information 143 such as "BUS LANE" and to detect the information on a sign 142. In this case also, the position of the own vehicle on the road can be determined. Furthermore, as shown in FIG. 15, the road information transmitted from information transmitters 152, which are embedded in the road, may be received by a receiver 151, which is mounted on the vehicle, to determine the position of the own vehicle on the road.

At step S163 of FIG. 11, the mode setting unit 102 determines whether the vehicle is on the lane close to the road shoulder. If the vehicle is on the lane close to the road shoulder, the process is terminated and returns to the flowchart of FIG. 8. If the vehicle is not on the lane close to the road shoulder, the process proceeds to step S164.

At step S164, the mode setting unit 102 executes a process for determining whether the lane can be changed. The process for determining whether the lane can be changed at step S164 will be described with reference to FIG. 16.

Figure 16:
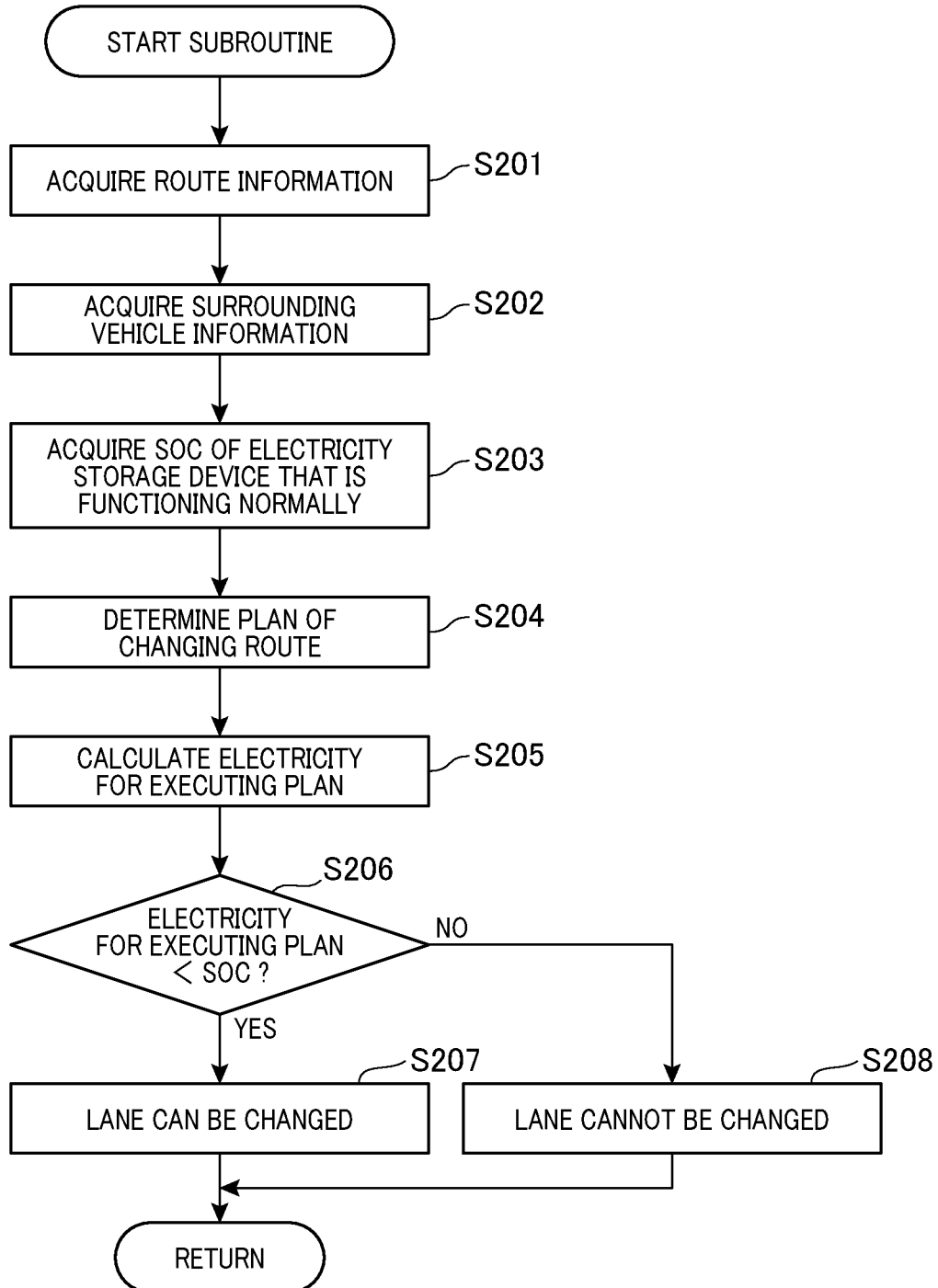
FIG. 16 is a flowchart for describing the fail operation mode.

At step S201 of FIG. 16, a route information acquiring process is executed. Since the route information acquiring process is the same as the process described with reference to FIGS. 12 to 15, the description will be omitted.

At step S202 subsequent to step S201, the surrounding vehicle information is acquired. The positions of all the surrounding vehicles are recognized based on, for example, the camera device, the sonar, the millimeter-wave sensor, and the LIDAR device, which are included in the own vehicle, the information about the outside of the own vehicle, and the information on other vehicles from the infrastructure outside of the own vehicle.

At step S203 subsequent to step S202, the state detection unit 101 acquires the SOC of the electricity storage device that is functioning normally. At step S204 subsequent to step S203, the mode setting unit 102 determines the plan of changing the route. At step S205 subsequent to step S204, the mode setting unit 102 calculates the amount of electricity necessary for executing the plan. In this case, if the starting of the engine is to be prohibited, whether the drive force is sufficient is also calculated.

At step S206 subsequent to step S205, the mode setting unit 102 determines whether the amount of electricity necessary for executing the plan is less than the detected SOC. If the amount of electricity necessary for executing the plan is less than the detected SOC, the process proceeds to step S207. If the amount of electricity necessary for executing the plan is not less than the detected SOC, the process proceeds to step S208.

At step S207, it is determined that the lane can be changed, and the process returns to the flowchart of FIG. 11. At step S208, it is determined that the lane cannot be changed, and the process returns to the flowchart of FIG. 11.

At step S165 of FIG. 11, it is determined whether the lane can be changed. If the lane can be changed, the process proceeds to step S166. If the lane cannot be changed, the process is terminated and returns to the flowchart of FIG. 8.

At step S166, the mode setting unit 102 causes the vehicle to change the lane to the lane close to the road shoulder, and the process returns to the flowchart of FIG. 8.

Figure 17:
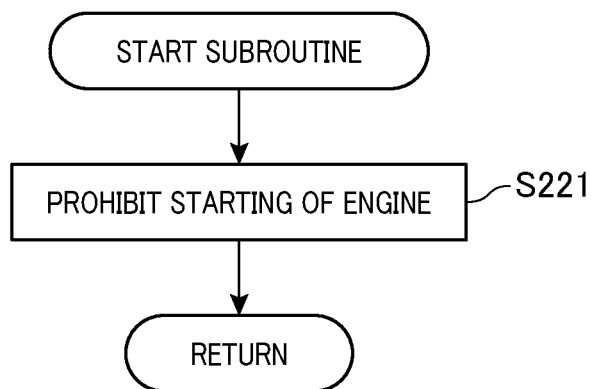
FIG. 17 is a flowchart for describing the fail operation mode.

Another example of the electricity storage process of step S108 will be described with reference to FIG. 17. At step S221, the mode setting unit 102 prohibits the starting of the engine. When the process of step S221 is finished, the process returns to the flowchart of FIG. 8.

Figure 18:
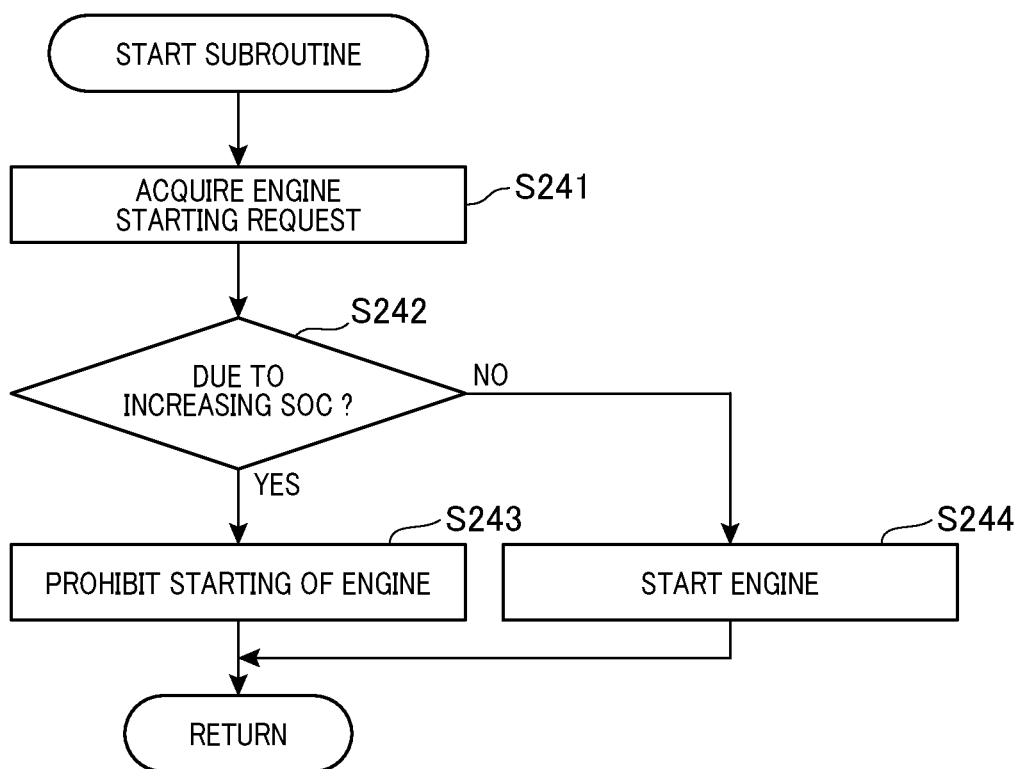
FIG. 18 is a flowchart for describing the fail operation mode.

Still another example of the electricity storage process of step S108 will be described with reference to FIG. 18. At step S241, an engine starting request is acquired. At step S242, it is determined whether the engine starting request is aimed at increasing the SOC. If the engine starting request is aimed at increasing the SOC, the process proceeds to step S243. If the engine starting request is not aimed at increasing the SOC, the process proceeds to step S244.

At step S243, the starting of the engine is prohibited, and the process returns to the flowchart of FIG. 8. At step S244, the engine is started, and the process returns to the flowchart of FIG. 8.

Figure 19:
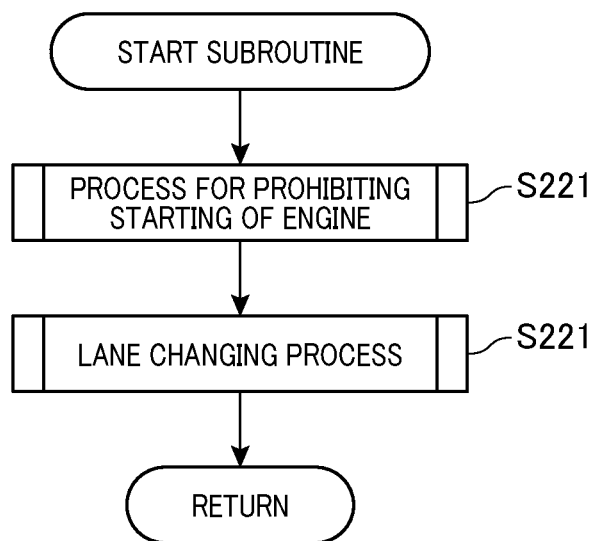
FIG. 19 is a flowchart for describing the fail operation mode.

The modification of the electricity storage process of step S108 will be described with reference to FIG. 19. At step S261, a process for prohibiting the starting of the engine is executed. As the process for prohibiting the starting of the engine, the process described with reference to FIG. 17 or the process described with reference to FIG. 18 is performed.

At step S262 subsequent to step S261, a lane changing process is executed. As the lane changing process, the process described with reference to FIG. 11 is performed. When the process of step S262 is finished, the process returns to the flowchart of FIG. 8.

At step S109 in FIG. 8, the state detection unit 101 determines whether at least one normal power source is only at least one power generator. If at least one normal power source is only at least one power generator, the process proceeds to step S110. If at least one normal power source is not only at least one power generator, the process proceeds to step S113.

At step S110, the state detection unit 101 determines whether two or more power generators are in the malfunctioning state. If two or more power generators are in the malfunctioning state, the process proceeds to step S111. If there are not two or more power generators in the malfunctioning state, the process proceeds to step S112.

At step S111, a multiple-malfunction power generation process is executed. The multiple-malfunction power generation process of step S111 will be described with reference to FIGS. 20, 21, and 22. In the state in which the multiple-malfunction power generation process is to be executed, all the electricity storage devices are in the malfunctioning state, and multiple power generators are in the malfunctioning state although at least one of the power generators is in the normal state. Under the circumstances, the evasive maneuver is performed using the power generator in the normal state effectively.

Figure 20:
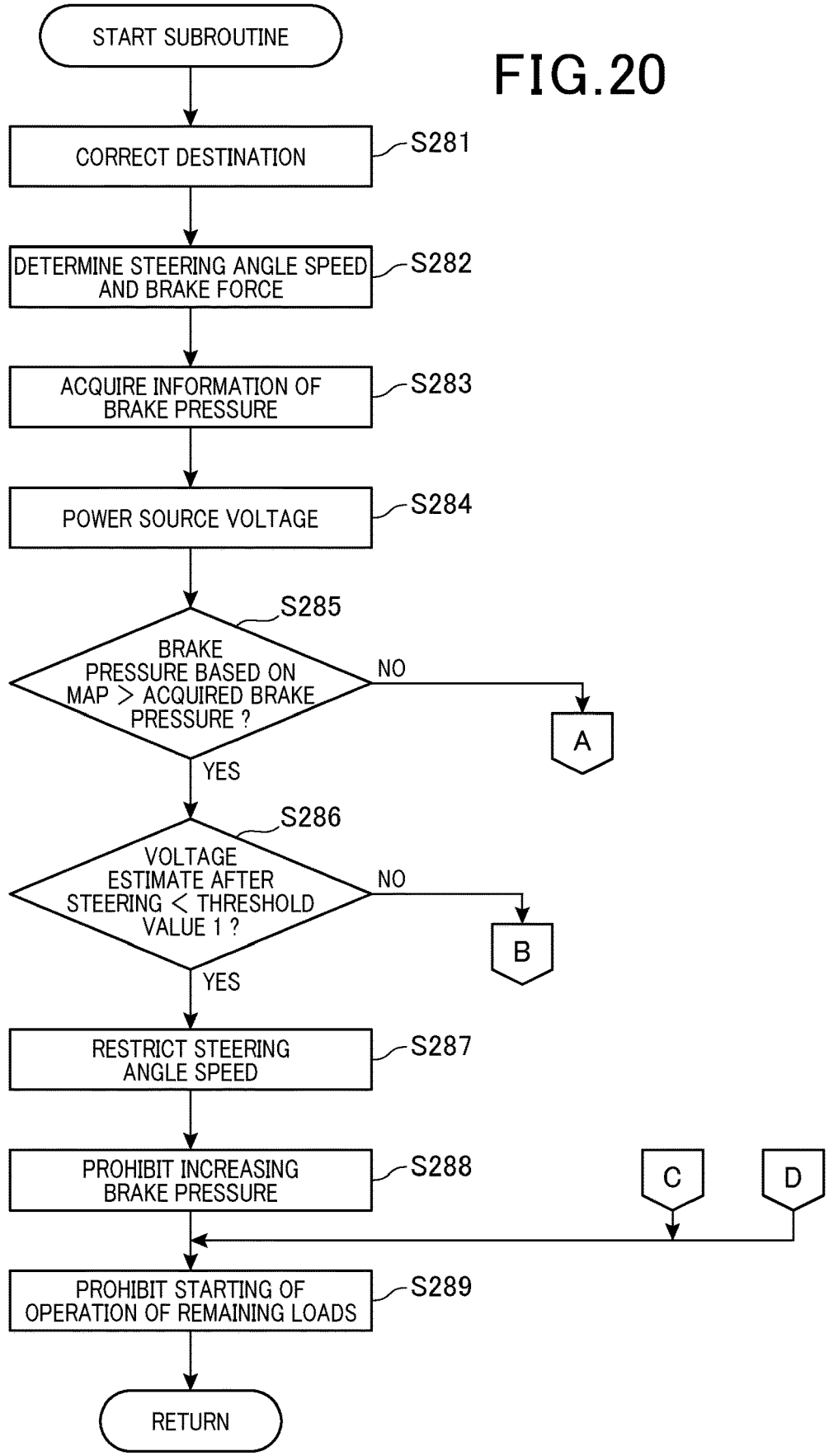
FIG. 20 is a flowchart for describing the fail operation mode.

At step S281 of FIG. 20, the destination is corrected, and the place to stop the vehicle is determined. At step S282 subsequent to step S281, the steering angle speed and the brake force are determined to stop the vehicle at the stopping place. Since it is only necessary to determine to change the steering wheel by the predetermined steering angle in the predetermined time, the steering angle may be set instead of the steering angle speed.

Figure 23:
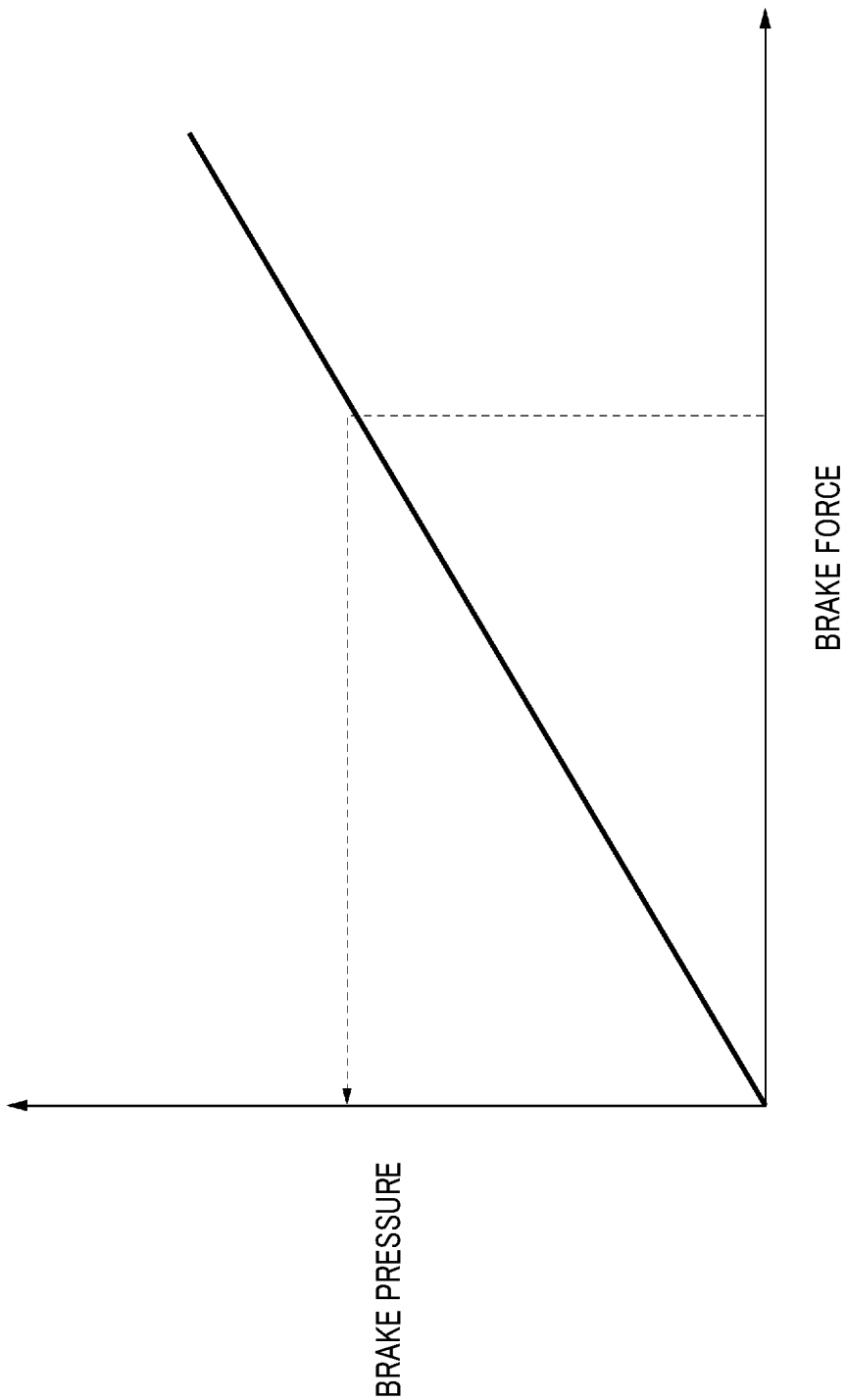
FIG. 23 is a graph for describing the fail operation mode.

At step S283 subsequent to step S282, the information of the brake pressure is acquired. The brake pressure is a hydraulic or negative pressure necessary for generating the brake force of the brake. The brake pressure relative to the brake force is calculated based on, for example, a map illustrated in FIG. 23.

At step S284 subsequent to step S283, the power source voltage is acquired. At step S285 subsequent to step S284, it is determined whether the measured brake pressure is lower than the brake pressure calculated based on the map. If the measured brake pressure is lower than the brake pressure calculated based on the map, the process proceeds to step S286. If the measured brake pressure is not lower than the brake pressure calculated based on the map, the process proceeds to step S291 of FIG. 21.

Figure 24:
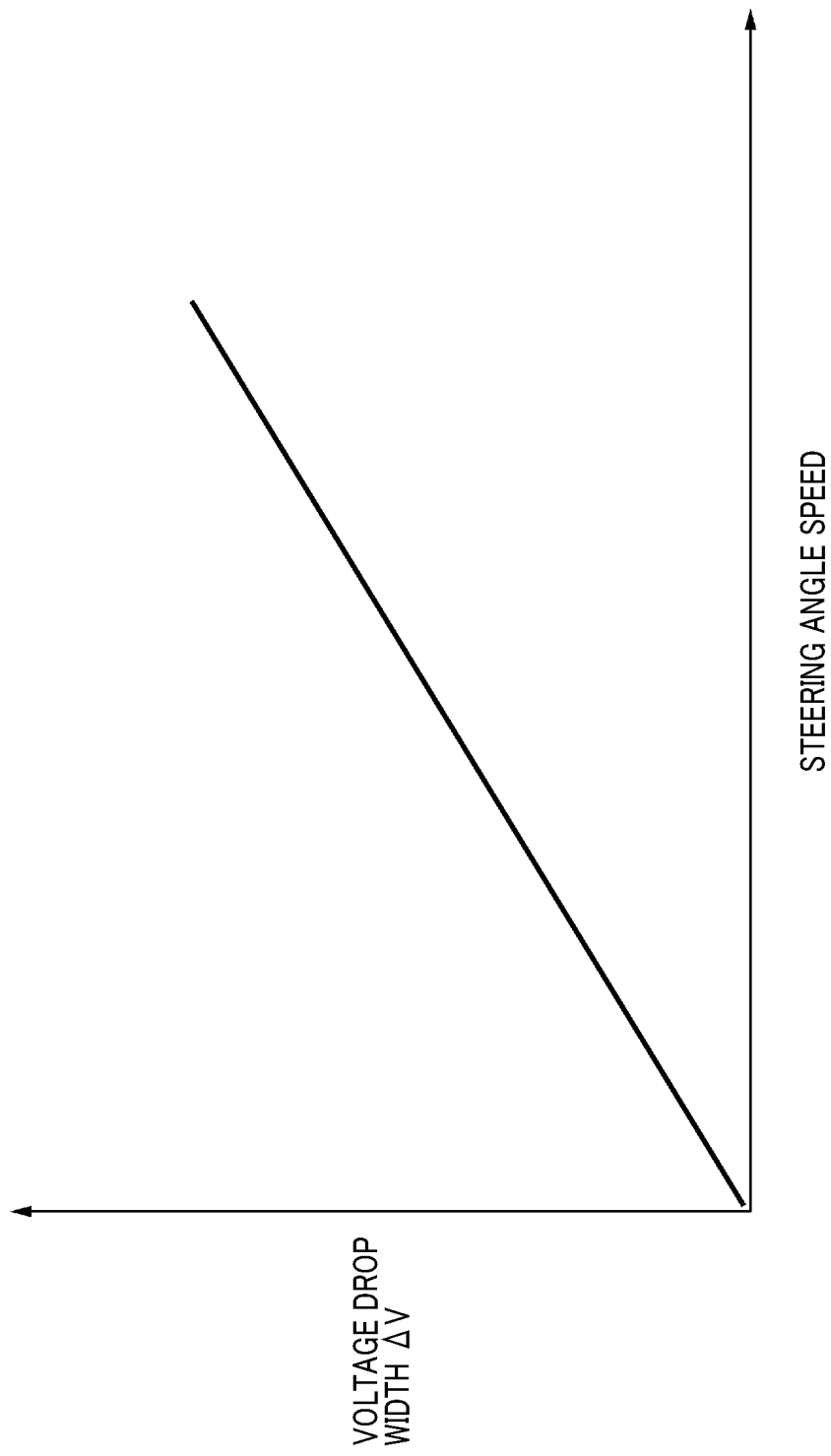
FIG. 24 is a graph for describing the fail operation mode.

At step S286, it is determined whether a voltage estimate after steering is lower than a threshold value T1. The voltage estimate after steering is calculated from the difference between a voltage drop width ΔV, which is obtained in accordance with the relationship between the steering angle speed and the voltage drop width based on the map illustrated in FIG. 24, and the power source voltage acquired in step S284. The threshold value T1 is set as a voltage at which a function necessary for the autonomous driving is stopped or momentarily stopped (refer to FIG. 25). The functions necessary for autonomous driving include functions such as steering. If the voltage estimate after steering is less than the threshold value T1, the process proceeds to step S287. If the voltage estimate after steering is not less than the threshold value T1, the process proceeds to step S301 of FIG. 22.

At step S287, the steering angle speed is restricted. The steering angle speed is restricted so that the voltage estimate after steering calculated based on the steering angle speed does not become lower than the threshold value T1. At step S288 subsequent to step S287, the brake pressure is prohibited from being increased.

Figure 21:
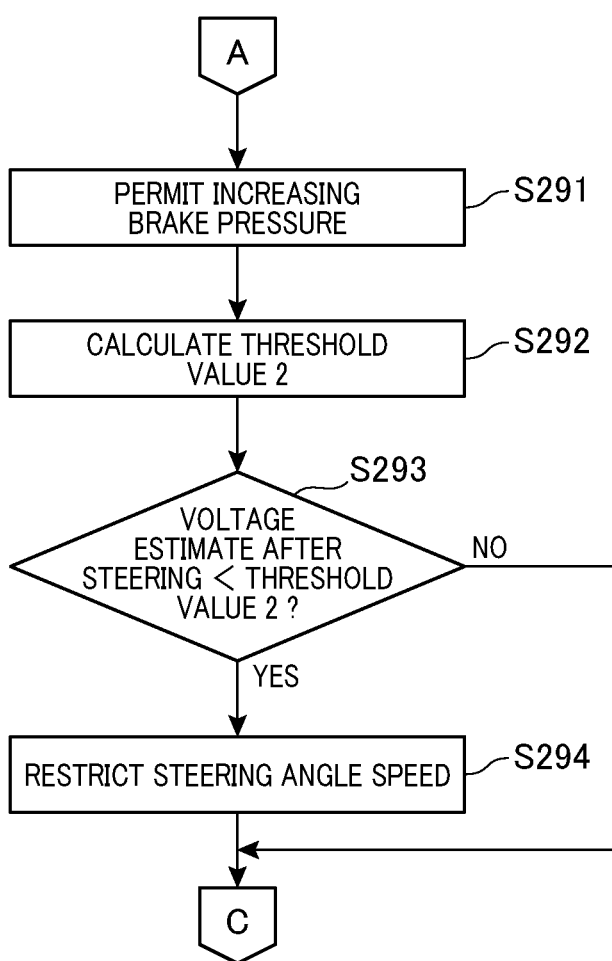
FIG. 21 is a flowchart for describing the fail operation mode.

At step S291 of FIG. 21, the brake pressure is permitted to be increased. This is because, at step S285 of FIG. 20, it is determined that the measured brake pressure is lower than the brake pressure calculated based on the map, and a higher priority is given to ensuring the brake pressure.

Figure 25:
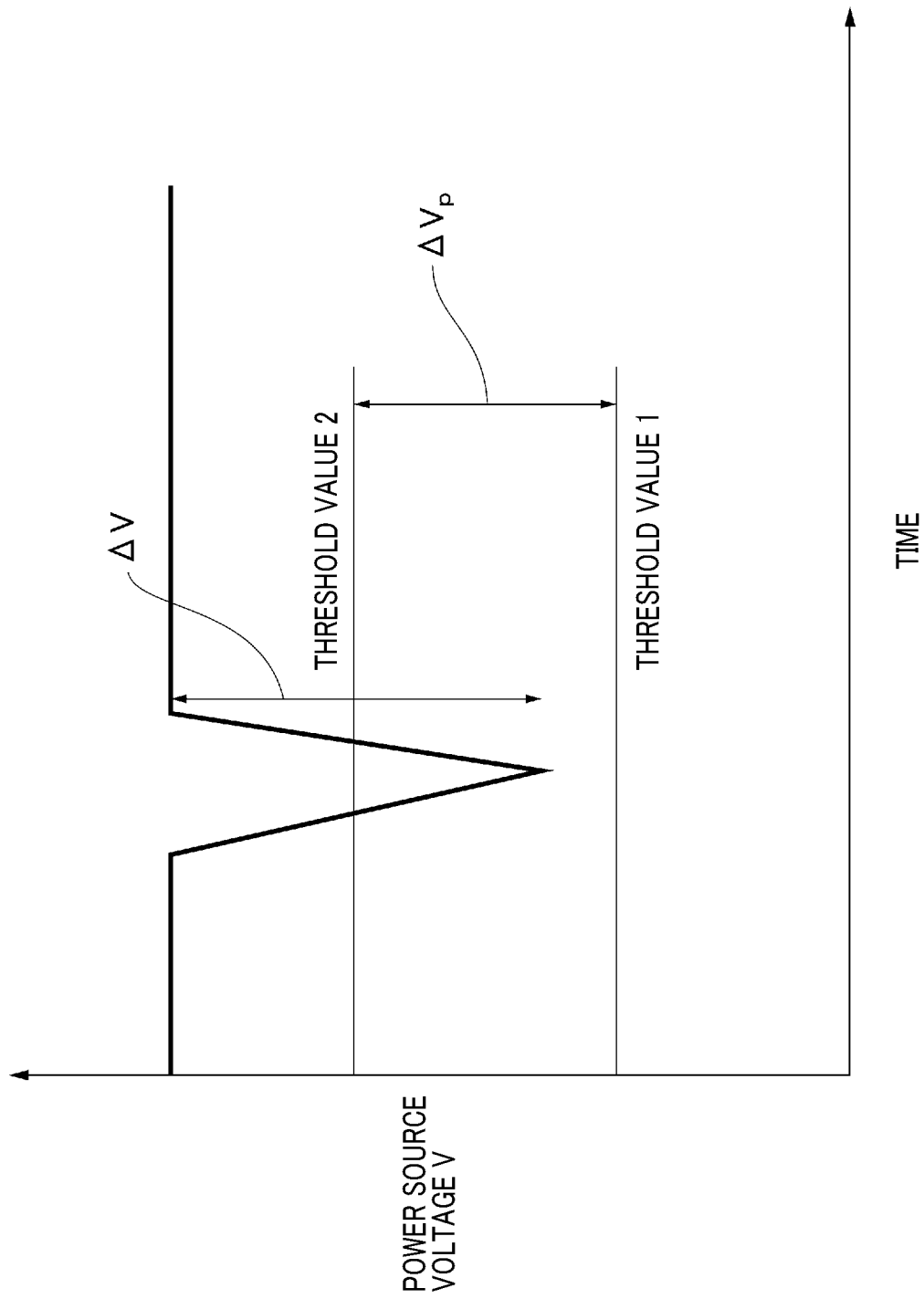
FIG. 25 is a graph for describing the fail operation mode.

At step S292 subsequent to step S291, a threshold value T2 is calculated. As shown in FIG. 25, the threshold value T2 is obtained by adding the voltage drop width $\Delta Vp$ when the brake pressure is increased to the threshold value T1.

At step S293 subsequent to step S292, it is determined whether the voltage estimate after steering is lower than the threshold value T2. If the voltage estimate after steering is lower than the threshold value T2, the process proceeds to step S294. If the voltage estimate after steering is not lower than the threshold value T2, the process is terminated and proceeds to step S289 of FIG. 20.

At step S294, the steering angle speed is restricted. The steering angle speed is restricted so that the voltage estimate after steering calculated based on the steering angle speed does not become lower than the threshold value T2. When the process of step S294 is finished, the process proceeds to step S289 of FIG. 20.

Figure 22:
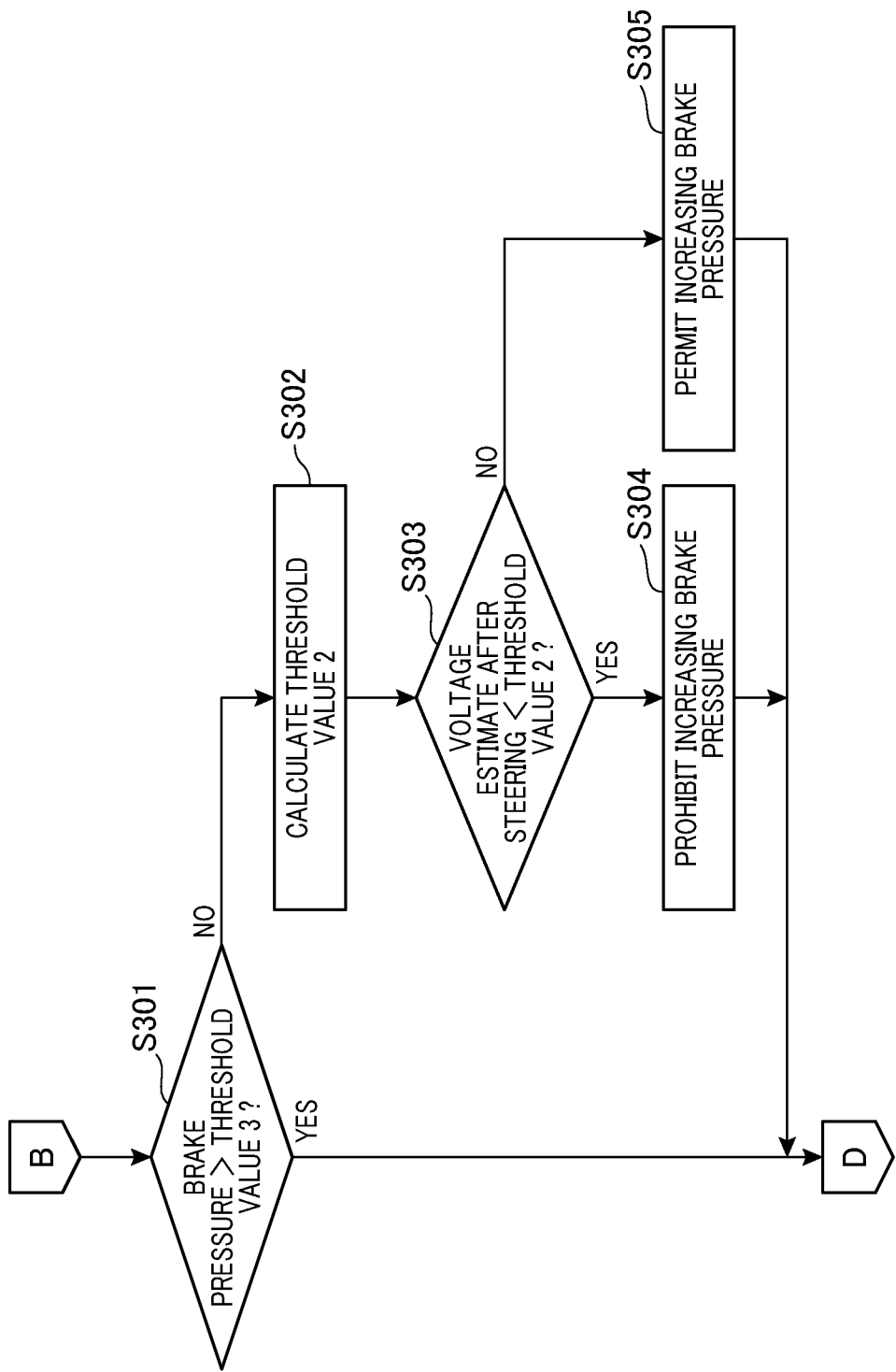
FIG. 22 is a flowchart for describing the fail operation mode.
Figure 26:
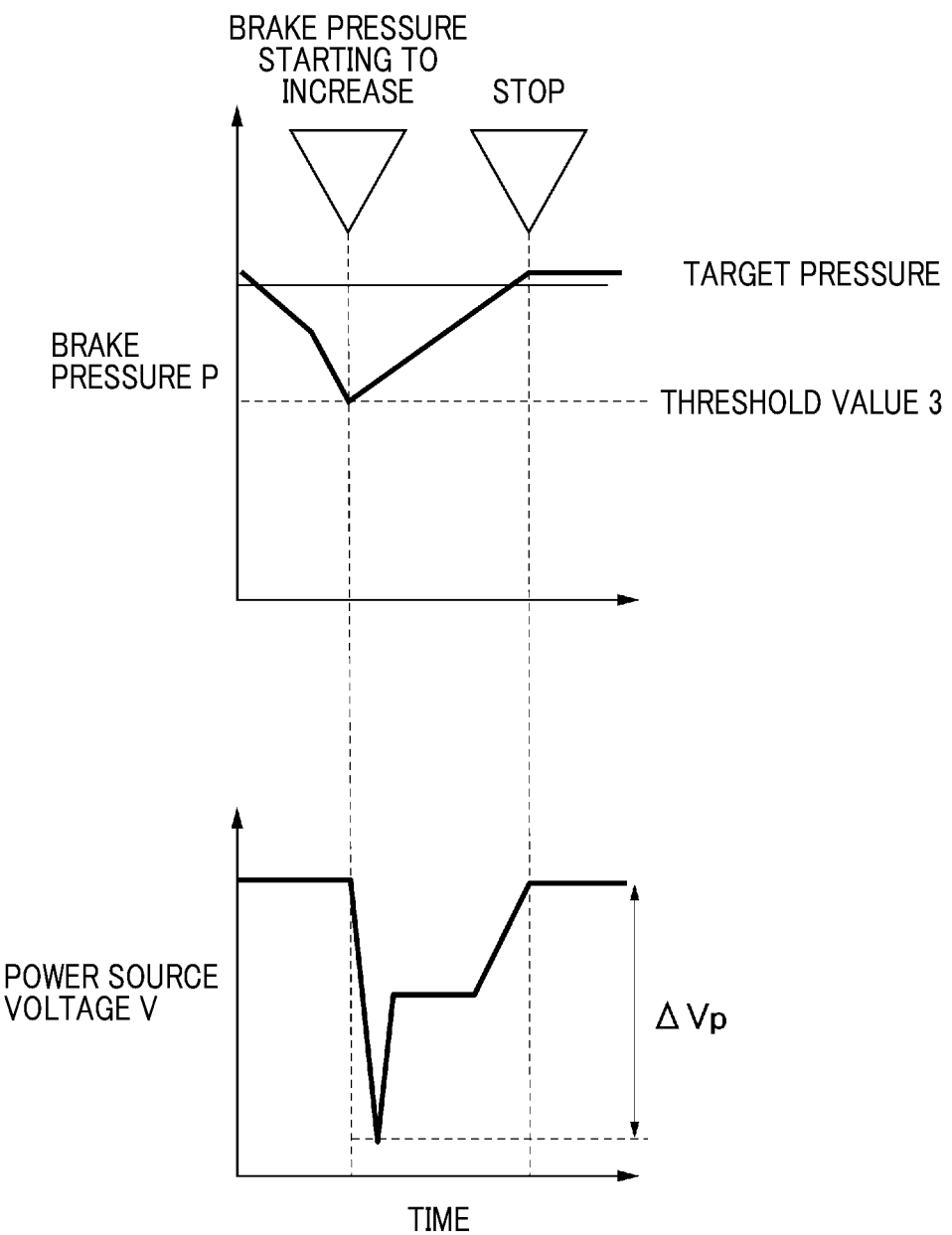
FIG. 26 is a graph for describing the fail operation mode.

At step S301 of FIG. 22, it is determined whether the brake pressure exceeds a threshold value T3. The threshold value T3 is a pressure at which a pump is operated to recover the pressure as shown in FIG. 26. A target pressure in FIG. 26 is a pressure to be prepared during normal operation. If the brake pressure exceeds the threshold value T3, the process is terminated and proceeds to step S289 of FIG. 20. If the brake pressure does not exceed the threshold value T3, the process proceeds to step S302.

At step S302, the threshold value T2 is calculated. Since the calculation of the threshold value T2 is the same as that at step S292 of FIG. 21, the description is omitted.

At step S303 subsequent to step S302, it is determined whether the voltage estimate after steering is lower than the threshold value T2. If the voltage estimate after steering is lower than the threshold value T2, the process proceeds to step S304. If the voltage estimate after steering is not lower than the threshold value T2, the process proceeds to step S305.

At step S304, the brake pressure is prohibited from being increased. At step S305, the brake pressure is permitted to be increased. When the processes of step S304 and step S305 are finished, the process proceeds to step S289 of FIG. 20.

At step S289 of FIG. 20, the starting of the operation of the remaining loads other than the steering and the brake is prohibited. It is not always necessary to prohibit the starting of the operation of all the loads other than the steering and the brake. For example, the starting of the operation of only high-load devices that may possibly stop the function, such as a defogger and a high-intensity discharge (HID) lamp, may be prohibited. Furthermore, if a value obtained by subtracting the voltage drop width during the high-load operation from the voltage after steering and braking exceeds the threshold value T1, the starting of the operation of the remaining loads other than the steering and the brake do not necessarily have to be prohibited. When the process of step S289 is finished, the process returns to the flowchart of FIG. 8.

Figure 27:
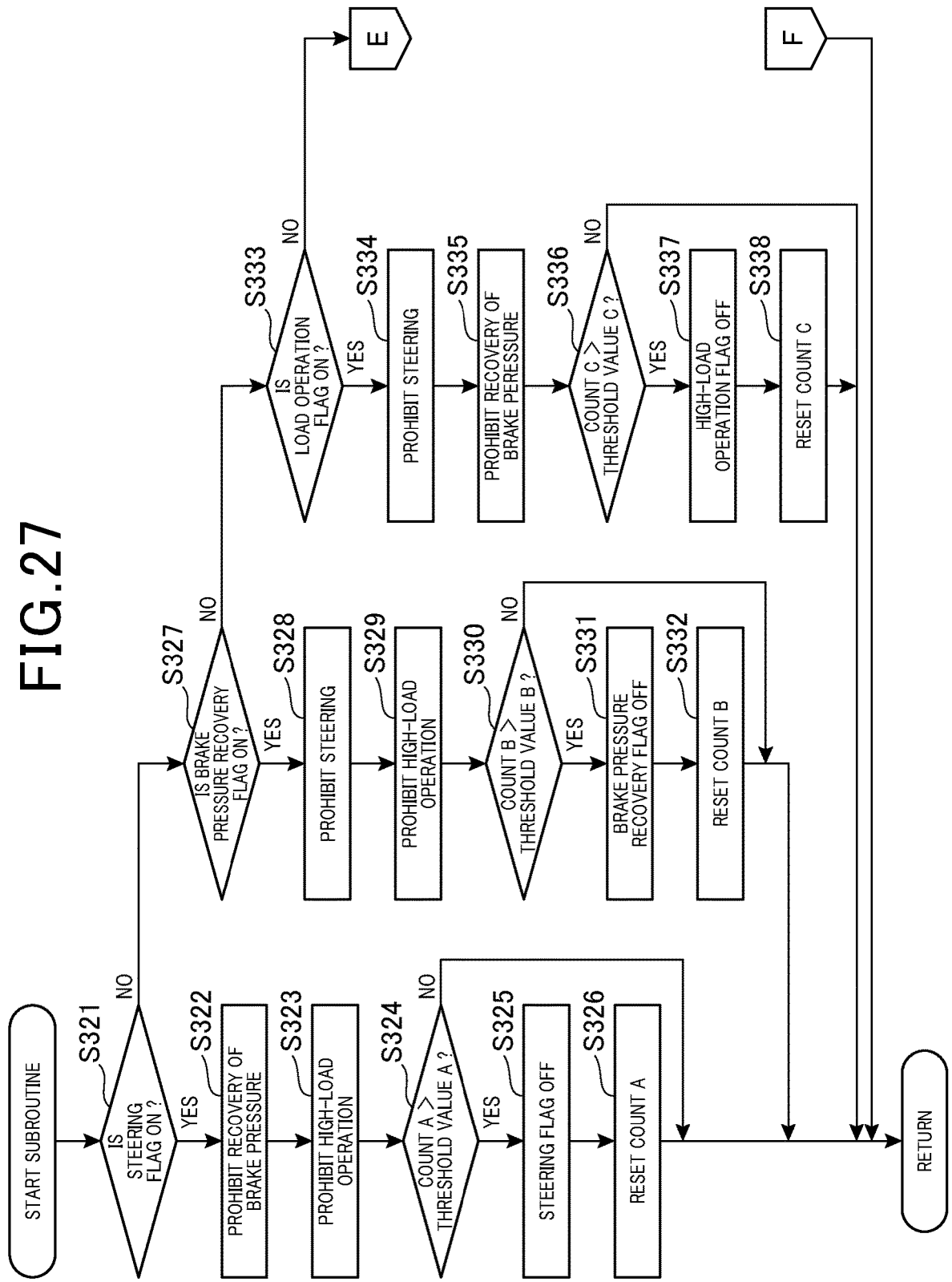
FIG. 27 is a flowchart for describing the fail operation mode.

Subsequently, another example of the multiple-malfunction power generation process of step S111 will be described with reference to FIGS. 27, 28, and 29. At step S321, it is determined whether a steering flag is ON. If the steering flag is ON, the process proceeds to step S322. If the steering flag is not ON, the process proceeds to step S327.

At step S322, the recovery of the brake pressure is prohibited. At step S323 subsequent to step S322, the high-load operation is prohibited.

At step S324 subsequent to step S323, it is determined whether a count A exceeds a threshold value A. The count A is a count for measuring a timing for operating the steering. The threshold value A represents the time taken for the instantaneous voltage drop caused directly after the steering operation to become stable. If the count A exceeds the threshold value A, it is determined that the instantaneous voltage drop caused directly after the steering operation has become stable, and the process proceeds to step S325. If the count A does not exceed the threshold value A, the process is terminated and returns to the flowchart of FIG. 8.

At step S325, the steering flag is turned OFF. At step S326 subsequent to step S325, the count A is reset. When the process of step S326 is finished, the process returns to the flowchart of FIG. 8.

At step S327, it is determined whether a brake pressure recovery flag is ON. If the brake pressure recovery flag is ON, the process proceeds to step S328. If the brake pressure recovery flag is not ON, the process proceeds to step S333.

At step S328, the steering is prohibited. At step S329 subsequent to step S328, high-load operation is prohibited.

At step S330 subsequent to step S329, it is determined whether a count B exceeds a threshold value B. The count B is a count for measuring a timing for operating the brake. The threshold value B represents the time taken for the instantaneous voltage drop caused directly after the braking operation to become stable. If the count B exceeds the threshold value B, it is determined that the instantaneous voltage drop directly after the braking operation has become stable, and the process proceeds to step S331. If the count B does not exceed the threshold value B, the process is terminated and returns to the flowchart of FIG. 8.

At step S331, the brake pressure recovery flag is turned OFF. At step S332 subsequent to step S331, the count B is reset. When the process of step S332 is finished, the process returns to the flowchart of FIG. 8.

At step S333, it is determined whether a load operation flag is ON. If the load operation flag is ON, the process proceeds to step S334. If the load operation flag is not ON, the process proceeds to step S341 of FIG. 28.

At step S334, the steering is prohibited. At step S335 subsequent to step S334, the recovery of the brake pressure is prohibited.

At step S336 subsequent to step S335, it is determined whether a count C exceeds a threshold value C. The count C is a count for measuring the timing for operating a load. The threshold value C represents the time taken for the instantaneous voltage drop directly after the load operation to become stable. If the count C exceeds the threshold value C, it is determined that the instantaneous voltage drop caused directly after the load operation has become stable, and the process proceeds to step S337. If the count C does not exceed the threshold value C, the process is terminated and returns to the flowchart of FIG. 8.

At step S337, the load operation flag is turned OFF. At step S338 subsequent to step S337, the count C is reset. When the process of step S338 is finished, the process returns to the flowchart of FIG. 8.

Figure 28:
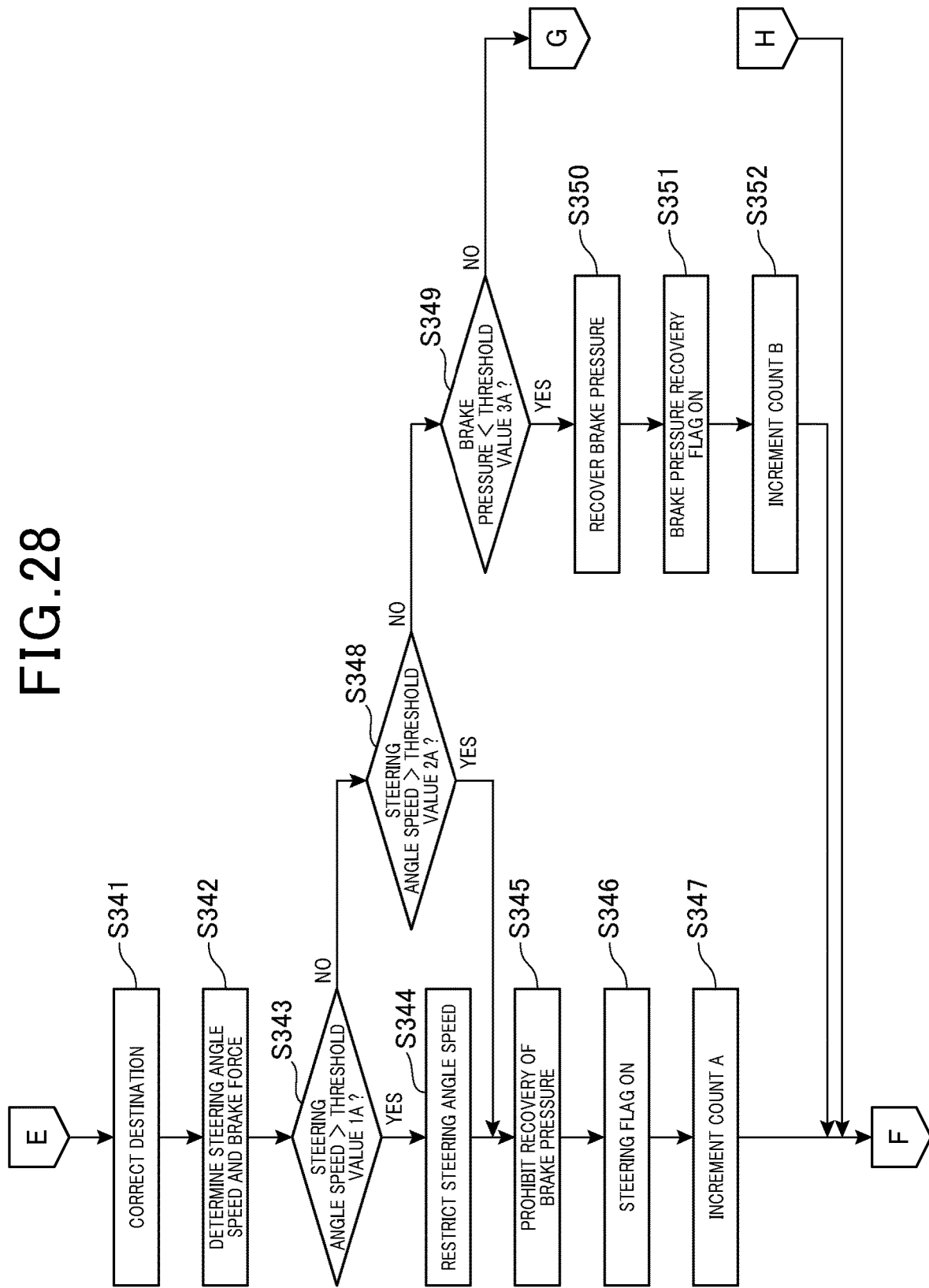
FIG. 28 is a flowchart for describing the fail operation mode.

At step S341 of FIG. 28, the destination is corrected, and the stopping place is determined. At step S342 subsequent to step S341, the steering angle speed and the brake force are determined to stop the vehicle at the stopping place. Since it is only necessary to determine to move the steering wheel by the predetermined steering angle in the predetermined time, the steering angle may be set instead of the steering angle speed.

Figure 30:
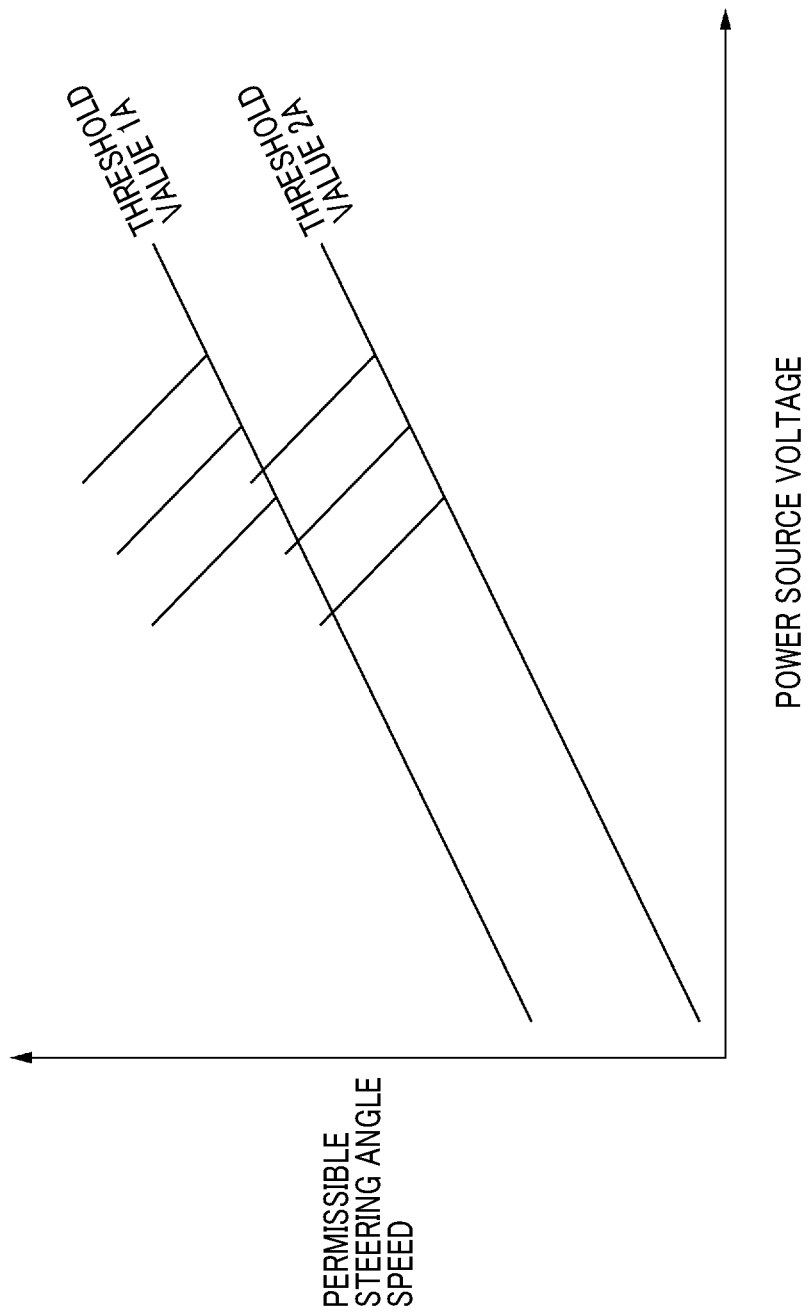
FIG. 30 is a graph for describing the fail operation mode.

At step S343 subsequent to step S342, it is determined whether the steering angle speed exceeds a threshold value T1A. As shown in FIG. 30, the threshold value T1A in this case is set based on the map of the steering angle speed with corresponding to the power source voltage, so that the function necessary for the autonomous driving is not stopped nor momentarily stopped even if steering is performed. The steering angle speed may be replaced with the steering angle. If the steering angle speed exceeds the threshold value T1A, it is determined that the function necessary for the autonomous driving is to be stopped, and the process proceeds to step S344. If the steering angle speed does not exceed the threshold value T1A, the process proceeds to step S348.

At step S344, the steering angle speed is restricted. At step S345 subsequent to step S344, the recovery of the brake pressure is prohibited. At step S346 subsequent to step S345, the steering flag is turned ON. At step S347 subsequent to step S346, the count A is incremented. When the process of step S347 is finished, the process returns to the flowchart of FIG. 27.

At step S348, it is determined whether the steering angle speed exceeds a threshold value T2A. As shown in FIG. 30, the threshold value T2A in this case is set based on the map of the steering angle speed with corresponding to the power source voltage, so that even if the steering and the recovery of the brake pressure are performed, the function necessary for the autonomous driving is not stopped nor momentarily stopped, or even if other loads are operated, the function necessary for the autonomous driving is not stopped nor momentarily stopped. If the steering angle speed exceeds the threshold value T2A, the process proceeds to step S345. If the steering angle speed does not exceed the threshold value T2A, the process proceeds to step S349.

At step S349, it is determined whether the brake pressure is lower than a threshold value T3A. Like the threshold value T3 described with reference to FIG. 26, the threshold value T3A is the pressure at which the pump is operated to recover the pressure. The target pressure of FIG. 26 is the pressure to be prepared during the normal operation. If the brake pressure is lower than the threshold value T3A, the process proceeds to step S350. If the brake pressure is not lower than the threshold value T3A, the process proceeds to step S353 of FIG. 29.

At step S350, the brake pressure is recovered. At step S351 subsequent to step S350, the brake pressure recovery flag is turned ON. At step S352 subsequent to step S351, the count B is incremented. When the process of step S352 is finished, the process returns to the flowchart of FIG. 27.

Figure 29:
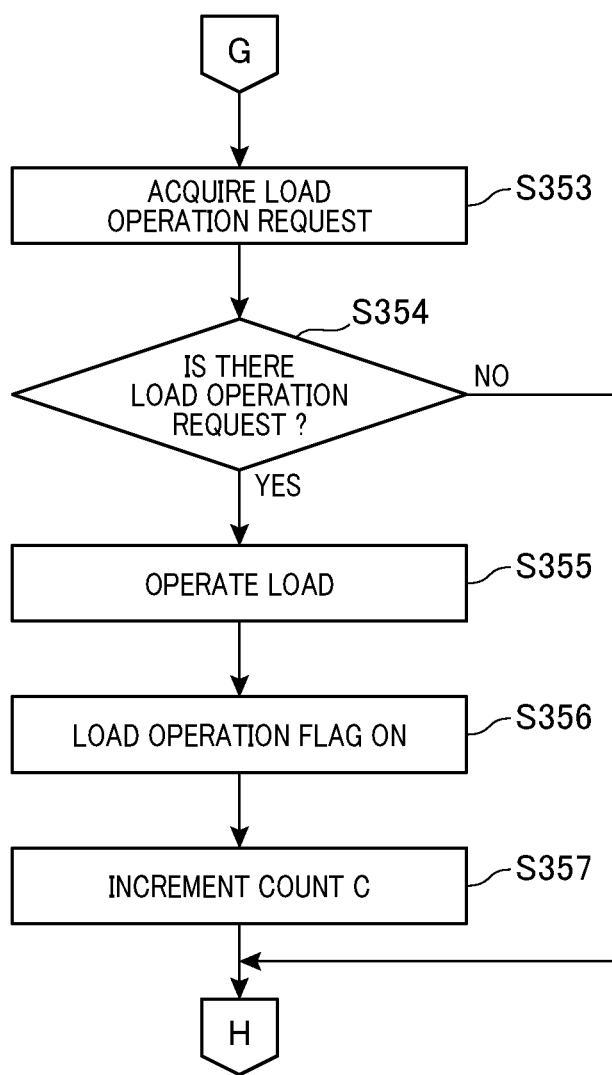
FIG. 29 is a flowchart for describing the fail operation mode.

At step S353 of FIG. 29, a load operation request is acquired. At step S354 subsequent to step S353, it is determined whether there is a load operation request. If there is a load operation request, the process proceeds to step S355. If there is no load operation request, the process returns to the flowchart of FIG. 28.

At step S355, the load is operated. At step S356 subsequent to step S355, the load operation flag is turned ON. At step S357 subsequent to step S356, the count C is incremented. When the process of step S357 is finished, the process returns to the flowchart of FIG. 28.

Figure 31:
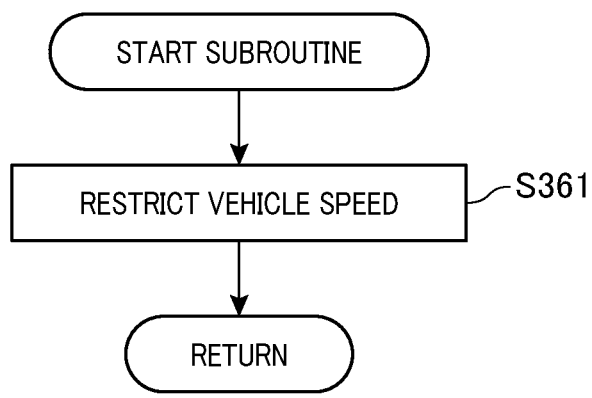
FIG. 31 is a flowchart for describing the fail operation mode.

At step S112 of FIG. 8, a power generation process is executed. One example of the power generation process of step S112 will be described with reference to FIG. 31. At step S361, the vehicle speed is restricted. When the process of step S361 is finished, the process returns to the flowchart of FIG. 8.

Figure 32:
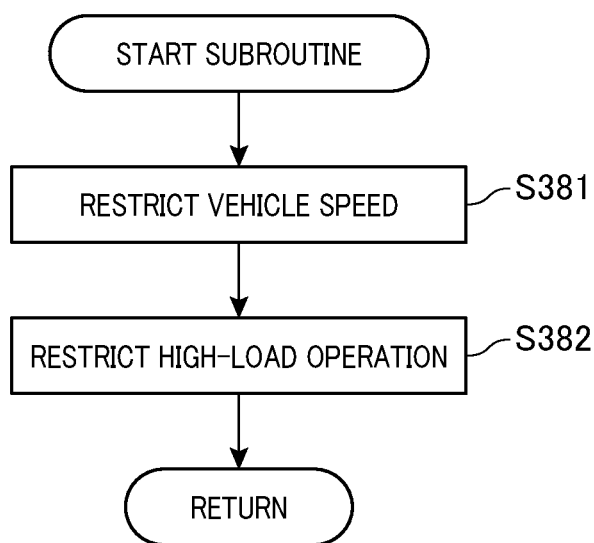
FIG. 32 is a flowchart for describing the fail operation mode.

Another example of the power generation process of step S112 will be described with reference to FIG. 32. At step S381, the vehicle speed is restricted. At step S382 subsequent to step S381, the high-load operation is restricted. When the process of step S382 is finished, the process returns to the flowchart of FIG. 8.

At step S113 of FIG. 8, it is determined that the power source is lost. At step S114 subsequent to step S113, the autonomous driving is disabled, and the process is terminated.

At step S115 subsequent to step S104, S107, S108, S111, and S112, a fail operation is executed by the autonomous driving.

Figure 33:
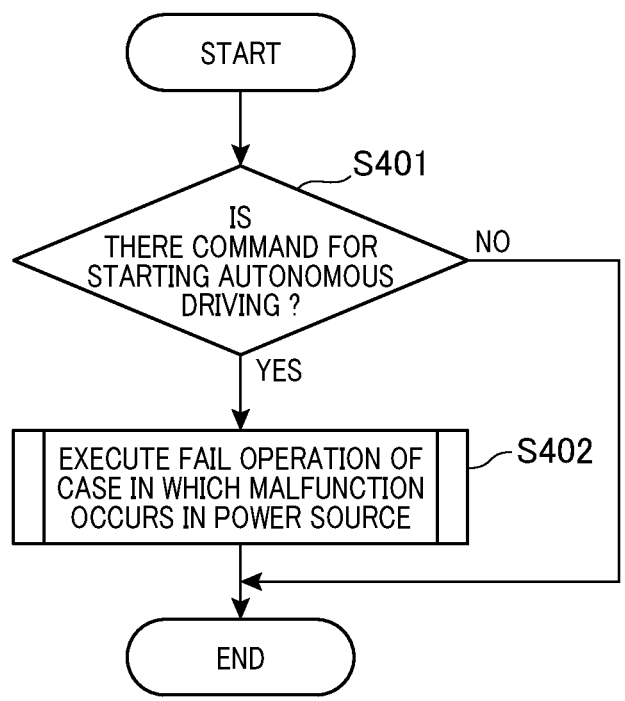
FIG. 33 is a flowchart for describing the fail operation mode.

The fail operation described with reference to FIG. 8 may be executed under specific conditions. As shown in FIG. 33, at step S401, it is determined whether there is an instruction for starting autonomous driving. If there is the instruction for starting autonomous driving, the process proceeds to step S402. If there is no instruction for starting autonomous driving, the process is terminated. At step S402, the fail operation described with reference to FIG. 8 is executed.

Figure 34:
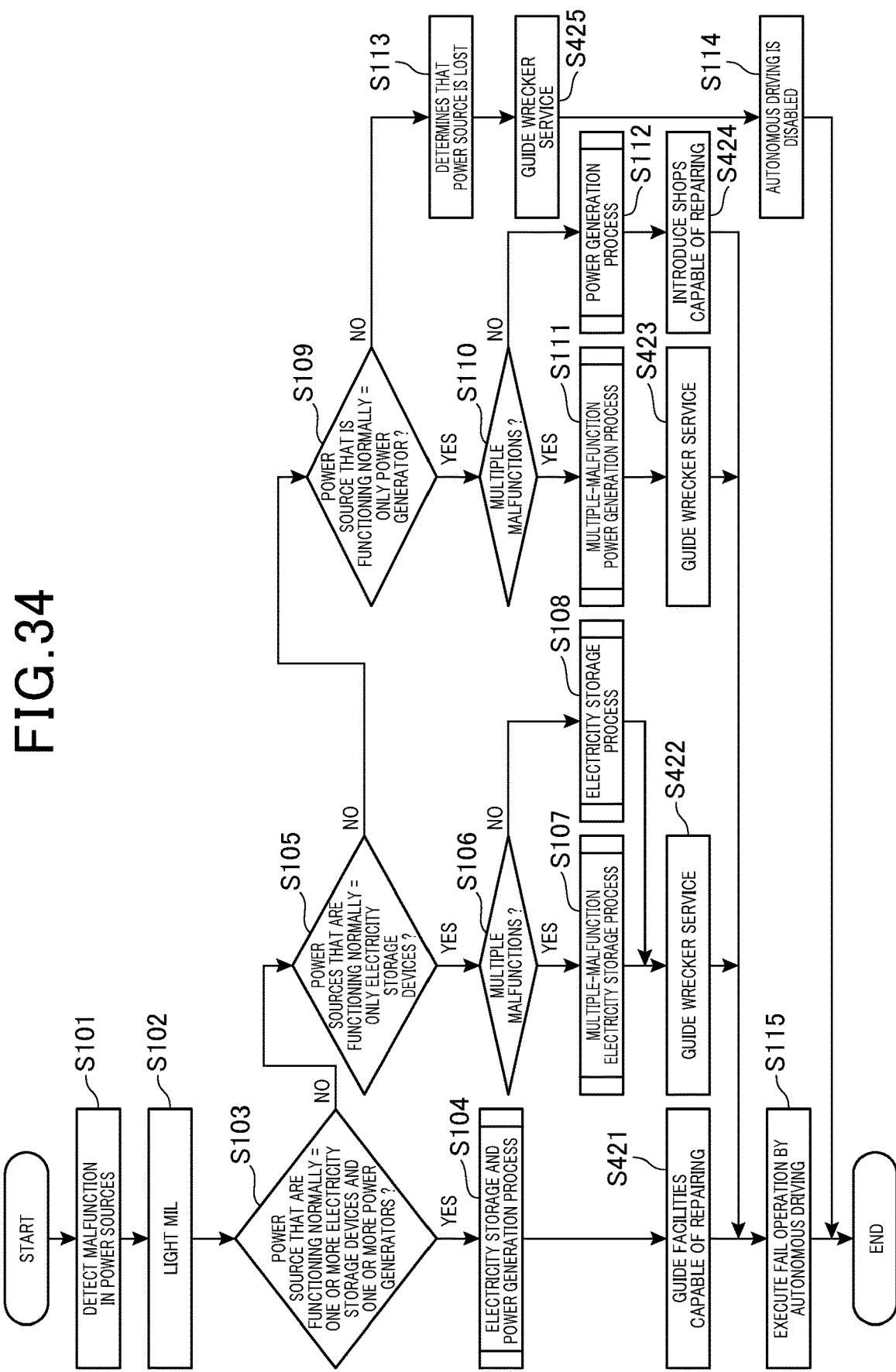
FIG. 34 is a flowchart for describing the fail operation mode.

It is possible to incorporate, in the fail operation described with reference to FIG. 8, a guide for measures taken when a malfunction occurs. One example is shown in FIG. 34. In FIG. 34, since the processes with the same reference numerals as those in FIG. 8 are already described, the descriptions are omitted.

At step S421 subsequent to step S104, facilities that are capable of performing repairs, such as a dealer, are notified to the driver. When the process of step S421 is finished, the process proceeds to step S115.

At step S422 subsequent to steps S107 and S108, a wrecker service is notified to the driver. When the process of step S422 is finished, the process proceeds to step S115.

At step S423 subsequent to step S111, a wrecker service is notified to the driver. When the process of step S423 is finished, the process proceeds to step S115.

At step S424 subsequent to step S112, facilities that are capable of performing repairs, such as a dealer, are notified to the driver. At step S424, a wrecker service may be notified to the driver. When the process of step S424 is finished, the process proceeds to step S115.

At step S425 subsequent to step S113, a wrecker service is notified to the driver. When the process of step S425 is finished, the process proceeds to step S114.

Figure 35:
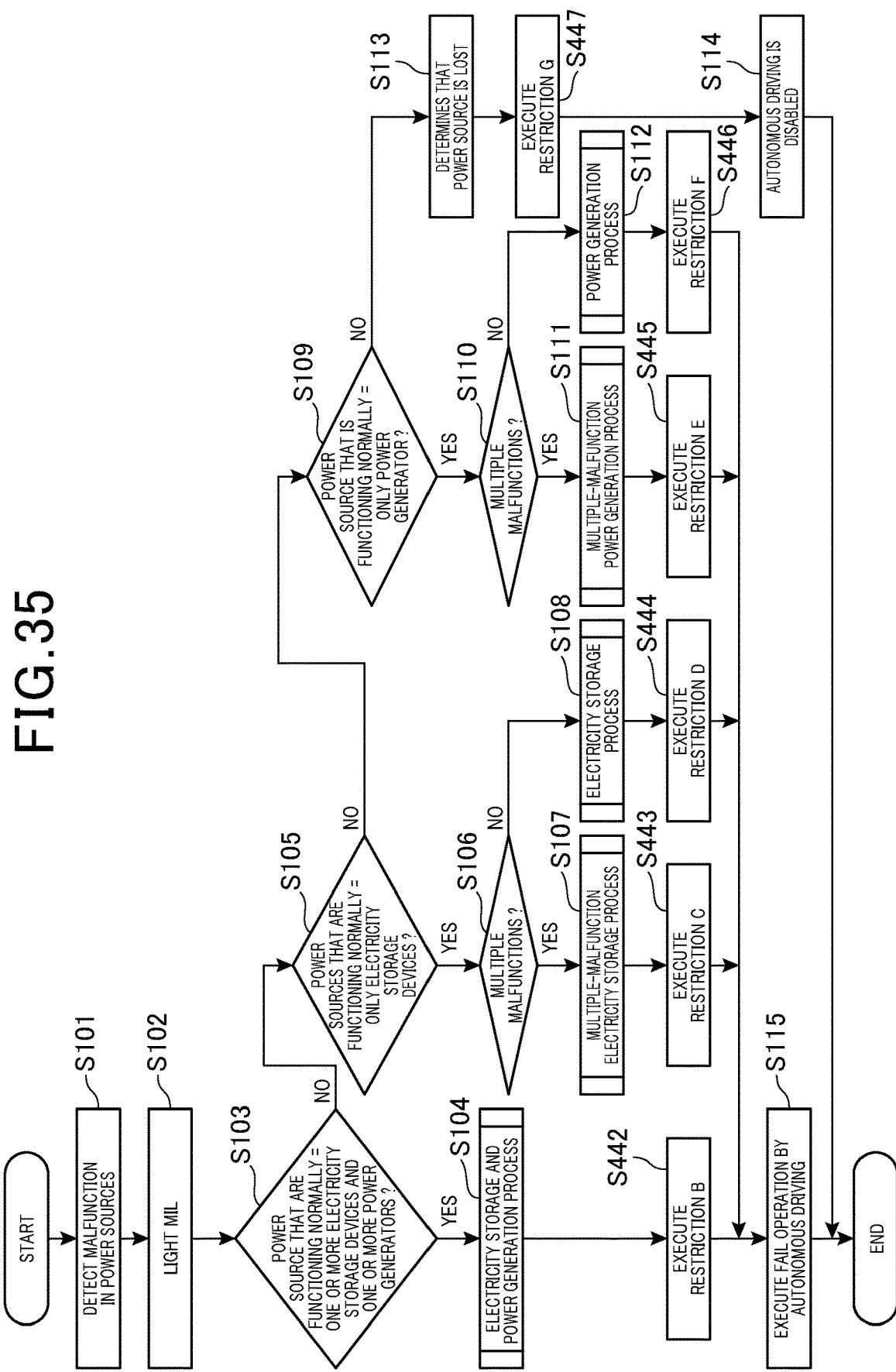
FIG. 35 is a flowchart for describing the fail operation mode.

It is also possible to further add a restriction to the fail operation described with reference to FIG. 8. One example is shown in FIG. 35. In FIG. 34, since the processes with the same reference numerals as those in FIG. 8 are already described, descriptions thereof are omitted.

At step S441 subsequent to step S102, a restriction A is executed. The specific examples of the restriction A are shown in FIGS. 36 and 37. When the process of step S441 is finished, the process proceeds to step S103.

At step S442 subsequent to step S104, a restriction B is executed. The specific examples of the restriction A are shown in FIGS. 36 and 37. When the process of step S442 is finished, the process proceeds to step S115.

At step S443 subsequent to step S107, a restriction C is executed. The specific examples of the restriction C are shown in FIGS. 36 and 37. When the process of step S443 is finished, the process proceeds to step S115.

At step S444 subsequent to step S108, a restriction D is executed. The specific examples of the restriction D are shown in FIGS. 36 and 37. When the process of step S444 is finished, the process proceeds to step S115.

At step S445 subsequent to step S111, a restriction E is executed. The specific examples of the restriction E are shown in FIGS. 36 and 37. When the process of step S445 is finished, the process proceeds to step S115.

At step S446 subsequent to step S112, a restriction F is executed. The specific examples of the restriction F are shown in FIGS. 36 and 37. When the process of step S446 is finished, the process proceeds to step S115.

At step S447 subsequent to step S113, a restriction G is executed. The specific examples of the restriction G are shown in FIGS. 36 and 37. When the process of step S447 is finished, the process proceeds to step S114.

The present embodiment is described with reference to the specific examples. However, the present disclosure is not limited to these specific examples. The specific examples modified by those skilled in the art as required may be included in the scope of the present disclosure as long as the characteristics of the present disclosure are included. Components included in each of the specific examples and the position, the condition, and the form of the components are not limited to those illustrated in the examples, but may be changed as required. The combinations of the components of each specific example described above can be changed as long as the combined modifications remain technically consistent with each other.

What is claimed is:

1. A travel control apparatus to be applied to an autonomous driving system for a vehicle, the travel control apparatus comprising:
a processor programmed to:
detect whether each of at least three power sources of the autonomous driving system including one or more electricity storage devices and one or more power generators is in a normal state or in a malfunctioning state; and
set a fail operation mode corresponding to a type of at least one of the power sources upon determination that the at least one of the power sources is in the malfunctioning state.

2. The travel control apparatus according to claim 1, wherein the processor is programmed to:
upon detecting that the at least one of the power sources is in the malfunctioning state, and at least one of the electricity storage devices and at least one of the power generators are in the normal state, set the fail operation mode that drives at least one of the power generators that is in the normal state so that a value of a state of charge (SOC) of at least one of the electricity storage devices that is in the normal state becomes higher than a normal value of the SOC of the at least one of the electricity storage device.

3. The travel control apparatus according to claim 1, wherein the processor is programmed to:
upon detecting that only one electricity storage device or only one power generator in the power sources is in the normal state, which is configured to supply electric power to at least one of functional devices that are necessary for autonomous driving, determine a setting of the fail operation mode for a case of the only one electricity storage device being in the normal state to be different from a setting of the fail operation mode for a case of the only one power generator being in the normal state.

4. The travel control apparatus according to claim 3, wherein the processor is programmed to:
upon detecting that only one electricity storage device in the power sources is in the normal state, which is configured to supply electric power to at least one of functional devices that are necessary for autonomous driving, set the fail operation mode in accordance with a state of charge (SOC) of the only one electricity storage device being in the normal state.

5. The travel control apparatus according to claim 4, wherein the processor is programmed to:
move the vehicle to a lane close to a road shoulder, when a value of the SOC of the only one electricity storage device being in the normal state is greater than an amount of electricity necessary for lane change planned based on a condition of a surrounding vehicle so that lane change is possible, and
keeps the vehicle on a current lane, when the value of the SOC of the only one electricity storage device being in the normal state is less than the amount of electricity necessary for lane change so that lane change is impossible.

6. The travel control apparatus according to claim 5, wherein the processor limits starting of an engine mounted on the vehicle.

7. The travel control apparatus according to claim 5, wherein the processor stops supplying electric power to a load unnecessary for limp-home mode of the vehicle performed by the autonomous driving system.

8. The travel control apparatus according to claim 3, wherein the processor is programmed to:
upon detecting that only one power generator in the power sources is in the normal state, which is configured to supply electric power to at least one of functional devices that are necessary for autonomous driving, the processor restricts a vehicle speed or operation of a device with a high electrical load while causing the only one power generator to generate electric power.

9. The travel control apparatus according to claim 3, wherein the processor is programmed to:
upon detecting that only one power generator in the power sources is in the normal state, which is configured to supply electric power to at least one of functional devices that are necessary for autonomous driving, the processor restricts a steering angle speed or prevents execution of a load required to output braking force from execution of another high load while causing the only one power generator to generate electric power.

10. The travel control apparatus according to claim 4, wherein when determining that the only one electricity storage device is in the normal state, or a total value of the SOC of the one or more electricity storage devices being in the normal state is less than a predetermined value, the processor causes the vehicle to stop at a safety place where the vehicle is estimated to be movable based on a value of the SOC of the only one electricity device or a total value of the SOC of the one or more electricity storage devices.

11. The travel control apparatus according to claim 1, wherein the processor executes at least one predetermined process when autonomous driving is started.

12. The travel control apparatus according to claim 1, wherein the processor is programmed to provide information corresponding to the malfunctioning state when detecting the malfunctioning state.

* * * * *